(12) United States Patent
Negishi et al.

(10) Patent No.: US 9,255,028 B2
(45) Date of Patent: Feb. 9, 2016

(54) OPTICAL GLASS, PRECISION PRESS MOLDING PREFORM, AND OPTICAL ELEMENT AND METHOD OF MANUFACTURING THE SAME

(71) Applicants: Tomoaki Negishi, Hino (JP); Yasuhiro Fujiwara, Mitaka (JP)

(72) Inventors: Tomoaki Negishi, Hino (JP); Yasuhiro Fujiwara, Mitaka (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/397,326

(22) PCT Filed: Apr. 24, 2013

(86) PCT No.: PCT/JP2013/062097
§ 371 (c)(1),
(2) Date: Oct. 27, 2014

(87) PCT Pub. No.: WO2013/161889
PCT Pub. Date: Oct. 31, 2013

(65) Prior Publication Data
US 2015/0119228 A1    Apr. 30, 2015

(30) Foreign Application Priority Data

Apr. 26, 2012  (JP) ................................ 2012-100544

(51) Int. Cl.
| | |
|---|---|
| *C03C 3/068* | (2006.01) |
| *C03C 3/066* | (2006.01) |
| *C03C 3/155* | (2006.01) |
| *C03C 11/00* | (2006.01) |
| *C03C 3/253* | (2006.01) |
| *C03B 23/00* | (2006.01) |
| *C03B 40/04* | (2006.01) |
| *C03B 7/12* | (2006.01) |
| *C03B 11/08* | (2006.01) |
| *C03B 11/12* | (2006.01) |
| *C03B 11/16* | (2006.01) |

(52) U.S. Cl.
CPC . *C03C 3/253* (2013.01); *C03B 7/12* (2013.01); *C03B 11/08* (2013.01); *C03B 11/122* (2013.01); *C03B 11/16* (2013.01); *C03B 23/0013* (2013.01); *C03B 40/04* (2013.01); *C03C 3/068* (2013.01); *C03B 2215/63* (2013.01); *C03B 2215/69* (2013.01); *C03C 3/066* (2013.01); *C03C 3/155* (2013.01)

(58) Field of Classification Search
CPC .......... C03C 3/068; C03C 3/066; C03C 3/15; C03C 3/155; C03B 11/00; C03B 11/12; C03B 11/122
See application file for complete search history.

(56) References Cited

U.S. PATENT DOCUMENTS

| | | | |
|---|---|---|---|
| 7,622,409 | B2 | 11/2009 | Hayashi |
| 7,932,197 | B2 | 4/2011 | Hayashi |
| 8,110,514 | B2 | 2/2012 | Negishi et al. |
| 8,338,320 | B2 | 12/2012 | Fujiwara |
| 8,410,008 | B2 | 4/2013 | Negishi et al. |
| 2005/0197243 | A1 | 9/2005 | Hayashi |
| 2008/0167172 | A1 | 7/2008 | Hayashi |
| 2009/0325779 | A1 | 12/2009 | Negishi et al. |
| 2010/0035744 | A1 | 2/2010 | Hayashi |
| 2010/0255979 | A1 | 10/2010 | Fujiwara |
| 2011/0105294 | A1 | 5/2011 | Negishi et al. |
| 2011/0257001 | A1 | 10/2011 | Negishi |
| 2011/0257002 | A1 | 10/2011 | Negishi |
| 2011/0263410 | A1* | 10/2011 | Negishi et al. ........ C03B 5/1675 501/78 |
| 2012/0100981 | A1 | 4/2012 | Negishi et al. |
| 2013/0079213 | A1 | 3/2013 | Fujiwara |

FOREIGN PATENT DOCUMENTS

| | | |
|---|---|---|
| JP | 2005247613 A | 9/2005 |
| JP | 2010030879 A | 2/2010 |
| JP | 2011093781 A | 5/2011 |
| JP | 2011225383 A | 11/2011 |
| JP | 2011225384 A | 11/2011 |
| WO | 2009144947 A1 | 12/2009 |
| WO | 2010053214 A1 | 5/2010 |

OTHER PUBLICATIONS

Jul. 16, 2013 International Search Report issued in International Application No. PCT/JP2013/062097.
Oct. 28, 2014 International Preliminary Report on Patentability issued in PCT/JP2013/062097.
Sep. 15, 2015 Office Action issued in Japanese Patent Application No. 2014-512654.

* cited by examiner

*Primary Examiner* — Anthony J Green
*Assistant Examiner* — Elizabeth A Bolden
(74) *Attorney, Agent, or Firm* — Harris A. Pitlick

(57) ABSTRACT

The optical glass is described that may be an oxide glass including, denoted as cation %, a total of 5 to 60% of $B^{3+}$ and $Si^{4+}$ (with 5 to 50% of $B^{3+}$), a total of equal to or higher than 5% of $Zn^{2+}$ and $Mg^{2+}$, a total of 10 to 50% of $La^{3+}$, $Gd^{3+}$, $Y^{3+}$, and $Yb^{3+}$, and a total of 6 to 45% of $Ti^{4+}$, $Nb^{5+}$, $Ta^{5+}$, $W^{6+}$, and $Bi^{3+}$ (a total content of $Ti^{4+}$ and $Ta^{5+}$ being higher than 0% and a content of $W^{6+}$ being higher than 5%).

10 Claims, No Drawings

OPTICAL GLASS, PRECISION PRESS MOLDING PREFORM, AND OPTICAL ELEMENT AND METHOD OF MANUFACTURING THE SAME

CROSS-REFERENCE TO RELATED APPLICATIONS

This application claims the benefit of priority to Japanese Patent Application No. 2012-100544 filed on Apr. 26, 2012, which is expressly incorporated herein by reference in its entirety.

TECHNICAL FIELD

The present invention relates to optical glass with high refractive index and high dispersion characteristics, a precision press molding preform and an optical element, each of which is comprised of the above optical glass, and method of manufacturing the above optical element.

BACKGROUND ART

The glass disclosed in Patent Document 1 is known among optical glasses for preparing glass optical elements such as aspherical lenses by precision press molding to be glass having a $B_2O_3$—$La_2O_3$ composition. The glass disclosed in Patent Document 1 is high refractive index, low dispersion glass with low dispersion even for high refractive index glass. Depending on the application of the optical element, high refractive index glass exhibiting higher dispersion characteristics than the glass described in Document 1 (WO2009/144947A1) or English language family members US2010/255979A1, U.S. Pat. No. 8,338,320, and US2013/079213A1 is required. The glasses disclosed in Document 2 (Japanese Unexamined Patent Publication (KOKAI) No. 2005-247613) or English language family members US2008/167172A1, U.S. Pat. No. 7,622,409, US2010/035744A1, U.S. Pat. No. 7,932,197, and US2005/197243A1; Document 3 (Japanese Unexamined Patent Publication (KOKAI) No. 2011-93781) or English language family member US2011/105294A1; Document 4 (Japanese Unexamined Patent Publication (KOKAI) No. 2011-225384) or English language family member US2011/257001A1; Document 5 (Japanese Unexamined Patent Publication (KOKAI) No. 2011-225383) or English language family member US2011/257002A1; Document 6 (Japanese Unexamined Patent Publication (KOKAI) No. 2010-30879, US2009/325779A1) or English language family members U.S. Pat. No. 8,110,514, US2012/100981A1, and U.S. Pat. No. 8,410,008, which are expressly incorporated herein by reference in their entirety, are known examples of such glasses.

The glasses described in Documents 2 and 4 to 6 are glasses that can be precision press molded. However, when a single pressing mold is used to repeatedly precision press mold several hundred articles using one of these glasses, clouding will be sometimes generated on the surface of the glass article obtained or the glass will sometimes fuse to the mold. Accordingly, an improvement in the glass molding property is desirable for large quantity production. This is thought to be occurring because the ratio of high refractive index, high dispersion components is increasing as the glass dispersion is rising.

Further, in the course of preparing a glass material for press molding, crystals sometimes precipitate out onto the surface of the glass when using the glass described in Document 3. Accordingly, an improvement in the thermal stability of the glass is desirable for large quantity production of glass materials.

As described above, increasing the suitability to precision press molding requires increasing the thermal stability during manufacturing of the glass.

An aspect of the present invention provides for optical glass having high refractive index and high dispersion characteristics that is excellent in thermal stability during glass manufacturing in addition to imparting the good press-molding property; to a precision press molding preform and an optical element, each of which is prepared from the above glass.

SUMMARY OF THE INVENTION

An aspect of the present invention relates to optical glass, which is oxide glass comprising, denoted as cation %,
a total of 5 to 60% of $B^{3+}$ and $Si^{4+}$, with 5 to 50% of $B^{3+}$,
a total of equal to or higher than 5% of $Zn^{2+}$ and $Mg^{2+}$,
a total of 10 to 50% of $La^{3+}$, $Gd^{3+}$, $Y^{3+}$, and $Yb^{3+}$, and
a total of 6 to 45% of $Ti^{4+}$, $Nb^{5+}$, $Ta^{5+}$, $W^{6+}$, and $Bi^{3+}$, with a total content of $Ti^{4+}$ and $Ta^{5+}$ being higher than 0% and a content of $W^{6+}$ being higher than 5%;
wherein a cation ratio of a content of $Si^{4+}$ to a content of $B^{3+}$, $Si^{4+}/B^{3+}$, is equal to or lower than 0.70;
a cation ratio of a content of $Ta^{5+}$ to a total content of $Ti^{4+}$ and $Ta^{5+}$, $Ta^{5+}/(Ti^{4+}+Ta^{5+})$, is equal to or higher than 0.23;
a cation ratio of a content of $W^{6+}$ to a total content of $Nb^{5+}$ and $W^{6+}$, $W^{6+}/(Nb^{5+}+W^{6+})$, is equal to or higher than 0.30;
a cation ratio of a total content of $Ti^{4+}$, $Nb^{5+}$, $Ta^{5+}$, $W^{6+}$, and $Bi^{3+}$ to a total content of $B^{3+}$ and $Si^{4+}$, $(Ti^{4+}+Nb^{5+}+Ta^{5+}+W^{6+}+Bi^{3+})/(B^{3+}+Si^{4+})$, is higher than 0.37 but equal to or lower than 3.00;
a cation ratio of a total content of $Zn^{2+}$, $Mg^{2+}$, and $Li^+$ to a total content of $La^{3+}$, $Gd^{3+}$, $Y^{3+}$, and $Yb^{3+}$, $(Zn^{2+}+Mg^{2+}+Li^+)/(La^{3+}+Gd^{3+}+Y^{3+}+Yb^{3+})$, is equal to or higher than 0.40; and
which has a refractive index nd ranging from 1.90 to 2.00 and an Abbé number vd satisfying the following equation (1):

$$25 \leq vd < (3.91-nd)/0.06 \qquad (1).$$

In an embodiment, the glass transition temperature of the above optical glass is equal to or lower than 650° C.

In an embodiment, the content of Ge in the above optical glass is less than 5.0 mass % as the content of $GeO_2$ in the glass composition based on oxides, and the cation ratio of the content of $Te^{4+}$ to the total content of $Zn^{2+}$ and $Mg^{2+}$, $Te^{4+}/(Zn^{2+}+Mg^{2+})$, is lower than 1.

In an embodiment, the above optical glass comprises equal to or higher than 8 cation % of $Zn^{2+}$ and $Mg^{2+}$ combined.

In an embodiment, the content of Yb in the above optical glass is lower than 2.0 mass % as the content of $Yb_2O_3$ in the glass composition based on oxides.

Another aspect of the present invention relates to optical glass, which is oxide glass comprising, denoted as cation %,
a total of 5 to 60% of $B^{3+}$ and $Si^{4+}$, with 5 to 60% of $B^{3+}$, 5 to 40% of $Zn^{2+}$,
a total of 10 to 50% of $La^{3+}$, $Gd^{3+}$, $Y^{3+}$, and $Yb^{3+}$, and
a total of 5 to 45% of $Ti^{4+}$, $Nb^{5+}$, $Ta^{5+}$, $W^{6+}$, and $Bi^{3+}$, with a total content of $Ti^{4+}$ and $Ta^{5+}$ being higher than 0% and a total content of $Nb^{5+}$ and $W^{6+}$ being higher than 0%;
wherein a cation ratio of a content of $Ta^{5+}$ to a total content of $Ti^{4+}$ and $Ta^{5+}$, $Ta^{5+}/(Ti^{4+}+Ta^{5+})$, is equal to or higher than 0.23;
a cation ratio of a content of $W^{6+}$ to a total content of $Nb^{5+}$ and $W^{6+}$, $W^{6+}/(Nb^{5+}+W^{6+})$, is equal to or higher than 0.30;

a cation content of a total content of $Ti^{4+}$, $Nb^{5+}$, $Ta^{5+}$, $W^{6+}$, and $Bi^{3+}$ to a total content of $B^{3+}$ and $Si^{4+}$, $(Ti^{4+}+Nb^{5+}+Ta^{5+}+W^{6+}+Bi^{3+})/(B^{3+}+Si^{4+})$, is higher than 0.37 but equal to or lower than 3.00; and which has a refractive index nd ranging from 1.90 to 2.00 and an Abbé number vd satisfying equation (1) above.

A further aspect of the present invention relates to a precision press molding preform comprised of the optical glass of the above aspect.

A further aspect of the present invention relates to an optical element comprised of the optical glass of the above aspect.

A further aspect of the present invention relates to a method of manufacturing an optical element, which comprises heating and precision press molding with a pressing mold the precision press molding preform of the above aspect to obtain an optical element.

In an embodiment, the method of manufacturing an optical element comprises heating the precision press molding preform together with a pressing mold after introducing the precision press molding preform into the pressing mold.

In an embodiment, the method of manufacturing an optical element comprises heating the precision press molding preform and then introducing into a pressing mold to conducting the precision press molding.

An aspect of the present invention can provide optical glass having high refractive index and high dispersion characteristics suited to precision press molding, a precision press molding preform and an optical element, each of which is comprised of the above optical glass.

MODE FOR CARRYING OUT THE INVENTION

Optical Glass

The optical glass according to an aspect of the present invention is oxide glass comprising, denoted as cation %, a total of 5 to 60% of $B^{3+}$ and $Si^{4+}$, with 5 to 50% of $B^{3+}$,
a total of equal to or higher than 5% of $Zn^{2+}$ and $Mg^{2+}$,
a total of 10 to 50% of $La^{3+}$, $Gd^{3+}$, $Y^{3+}$, and $Yb^{3+}$, and
a total of 6 to 45% of $Ti^{4+}$, $Nb^{5+}$, $Ta^{5+}$, $W^{6+}$, and $Bi^{3+}$, with a total content of $Ti^{4+}$ and $Ta^{5+}$ being higher than 0% and a content of $W^{6+}$ being higher than 5%;

wherein a cation ratio of a content of $Si^{4+}$ to a content of $B^{3+}$, $Si^{4+}/B^{3+}$, is equal to or lower than 0.70;

a cation ratio of a content of $Ta^{5+}$ to a total content of $Ti^{4+}$ and $Ta^{5+}$, $Ta^{5+}/(Ti^{4+}+Ta^{5+})$, is equal to or higher than 0.23;

a cation ratio of a content of $W^{6+}$ to a total content of $Nb^{5+}$ and $W^{6+}$, $W^{6+}/(Nb^{5+}+W^{6+})$, is equal to or higher than 0.30;

a cation ratio of a total content of $Ti^{4+}$, $Nb^{5+}$, $Ta^{5+}$, $W^{6+}$, and $Bi^{3+}$ to a total content of $B^{3+}$ and $Si^{4+}$, $(Ti^{4+}+Nb^{5+}+Ta^{5+}+W^{6+}+Bi^{3+})/(B^{3+}+Si^{4+})$, is higher than 0.37 but equal to or lower than 3.00;

a cation ratio of a total content of $Zn^{2+}$, $Mg^{2+}$, and $Li^+$ to a total content of $La^{3+}$, $Gd^{3+}$, $Y^{3+}$, and $Yb^{3+}$, $(Zn^{2+}+Mg^{2+}+Li^+)/(La^{3+}+Gd^{3+}+Y^{3+}+Yb^{3+})$, is equal to or higher than 0.40; and which has a refractive index nd ranging from 1.90 to 2.00 and an Abbé number vd satisfying the following equation (1):

$$25 \leq vd < (3.91-nd)/0.06 \qquad (1).$$

The optical glass according to an aspect of the present invention is oxide glass with a principal anion component in the form of $O^{2-}$. Anion components in the form of small quantities of $Cl^-$ and $F^-$ can be added as clarifying agents. To provide optical glass of desired optical characteristics and good glass stability, it is desirable for the content of $O^{2-}$ to be equal to or higher than 98 anion %, preferably equal to or higher than 99 anion %, more preferably equal to or higher than 99.5 anion %, and still more preferably, 100 anion %. In an embodiment of the present invention, the term "anion %" means the percentage of anion components.

The composition of the optical glass according to an aspect of the present invention will be described in greater detail below. Unless specifically stated otherwise, the contents and total contents of the various cation components are denoted as cation %. In an embodiment of the present invention, the term cation % means the percentage of cation components.

Glass Composition $B^{3+}$ and $Si^{4+}$ are glass network-forming components that have the effect of maintaining glass stability. When the total content of $B^{3+}$ and $Si^{4+}$ is less than 5%, resistance to devitrification deteriorates, the liquidus temperature rises, and glass manufacturing becomes difficult. Additionally, when the total content of $B^{3+}$ and $Si^{4+}$ exceeds 60%, it becomes difficult to achieve the desired refractive index. Accordingly, the total content of $B^{3+}$ and $Si^{4+}$ is set to 5 to 60%. The lower limit of the total content of $B^{3+}$ and $Si^{4+}$ is desirably 10%, preferably 15%, more preferably 20%, still more preferably 25%, yet more preferably 30%, and yet still more preferably, 33%. The upper limit of the total content of $B^{3+}$ and $Si^{4+}$ is desirably 50%, preferably 45%, still more preferably 43%, yet more preferably 42%, and yet still more preferably, 41%.

Herein, in addition to the above function and effect, $B^{3+}$ is an essential component that functions to maintain the melting property of the glass. When the content of $B^{3+}$ is less than 5%, it becomes difficult to achieve the above effects. When the content of $B^{3+}$ exceeds 50%, it becomes difficult to achieve the desired refractive index, striae are generated by volatization from the glass melt, and optical homogeneity deteriorates. Accordingly, the content of $B^{3+}$ is set to 5 to 50%. The lower limit of the $B^{3+}$ content is desirably 10%, preferably 15%, more preferably 20%, still more preferably 25%, and yet more preferably 26%. The upper limit of the $B^{3+}$ content is desirably 45%, preferably 40%, more preferably 39%, still more preferably 38%, and yet more preferably, 37%.

In the optical glass according to an aspect of the present invention, from the perspectives of improving the thermal stability of the glass, achieving a viscosity suited to molding of the glass melt, inhibiting an excessive rise in the glass transition temperature, and improving chemical durability, the cation ratio of the $Si^{4+}$ content to the $B^{3+}$ content ($Si^{4+}/B^{3+}$) is set to equal to or lower than 0.70. It is desirably equal to or lower than 0.50, preferably equal to or lower than 0.40, more preferably equal to or lower than 0.30, and even more preferably, equal to or lower than 0.20. In order to inhibit a rise in the liquidus temperature and maintain the melting property and resistance to devitrification, the cation ratio ($Si^{4+}/B^{3+}$) is desirably equal to or higher than 0.01, preferably equal to or higher than 0.02, and more preferably, equal to or higher than 0.03.

$Zn^{2+}$ and $Mg^{2+}$ function to enhance the melting property of the glass and lower the glass transition temperature. In particular, $Zn^{2+}$ functions to greatly lower the glass transition temperature while maintaining a high refractive index, as well as functioning to improve glass stability and lower the liquidus temperature. In the optical glass according to an aspect of the present invention, from the perspective of achieving the above effects, the total content of $Zn^{2+}$ and $Mg^{2+}$ is set to equal to or higher than 5%. To enhance the melting property and lower the glass transition temperature, the total content of $Zn^{2+}$ and $Mg^{2+}$ is desirably equal to or higher than 8%, preferably equal to or higher than 9%, more preferably equal to or higher than 10%, still more preferably equal to or higher than 12%, yet more preferably equal to or higher than 14%, and yet still more preferably, equal to or higher than 16%.

Additionally, the stability of the glass tends to decrease when the total content of $Zn^{2+}$ and $Mg^{2+}$ exceeds 40%. Accordingly, the total content of $Zn^{2+}$ and $Mg^{2+}$ is desirably equal to or lower than 40%. To maintain good glass stability, the total content of $Zn^{2+}$ and $Mg^{2+}$ is preferably equal to or lower than 35%, more preferably equal to or lower than 30%, still more preferably equal to or lower than 28%, yet more preferably equal to or lower than 26%, and yet still more preferably, equal to or lower than 24%.

To lower the glass transition temperature and liquidus temperature while maintaining a high refractive index, the lower limit of the content of $Zn^{2+}$ is desirably 5%, preferably 8%, more preferably 9%, still more preferably 10%, yet more preferably 12%, yet still more preferably 14%, and even more preferably, 16%.

To maintain good glass stability, the upper limit of the $Zn^{2+}$ content is desirably 40%, preferably 35%, more preferably 30%, still more preferably 28%, yet more preferably 26%, and yet still more preferably, 24%.

Compared to $Zn^{2+}$, $Mg^{2+}$ functions less strongly to lower the glass transition temperature and tends to lower the refractive index. Thus, the $Mg^{2+}$ content desirably falls within a range of 0 to 30%, preferably within a range of 0 to 25%, more preferably within a range of 0 to 20%, still more preferably within a range of 0 to 15%, yet more preferably within a range of 0 to 10%, yet still more preferably within a range of 0 to 5%, and yet still further preferably, within a range of 0 to 1%. The $Mg^{2+}$ content can be 0%.

To lower the glass transition temperature while maintaining a high refractive index and glass stability, the cation ratio of the $Zn^{2+}$ content to the total content of $Zn^{2+}$ and $Mg^{2+}$ ($Zn^{2+}/(Zn^{2+}+Mg^{2+})$) is desirably equal to or higher than 0.6, preferably equal to or higher than 0.8, more preferably equal to or higher than 0.9, still more preferably equal to or higher than 0.95, and yet more preferably, 1.0.

$La^{3+}$, $Gd^{3+}$, $Y^{3+}$, and $Yb^{3+}$ function to raise the refractive index without increasing dispersion or the partial dispersion ratio $\Delta Pg$, F. When the total content of $La^{3+}$, $Gd^{3+}$, $Y^{3+}$, and $Yb^{3+}$ is lower than 10%, it becomes difficult to achieve the above effects. When the total content of $La^{3+}$, $Gd^{3+}$, $Y^{3+}$, and $Yb^{3+}$ exceeds 50%, the stability of the glass decreases, the glass transition temperature rises, and the melting property of the glass deteriorates. Accordingly, the total content of $La^{3+}$, $Gd^{3+}$, $Y^{3+}$, and $Yb^{3+}$ is set to 10 to 50%. The lower limit of the total content of $La^{3+}$, $Gd^{3+}$, $Y^{3+}$, and $Yb^{3+}$ is desirably 12%, preferably 14%, more preferably 16%, and still more preferably 18%. The upper limit of the total content of $La^{3+}$, $Gd^{3+}$, $Y^{3+}$, and $Yb^{3+}$ is desirably 45%, preferably 40%, more preferably 35%, still more preferably 30%, and yet more preferably, 28%.

$La^{3+}$, $Gd^{3+}$, $Y^{3+}$, and $Yb^{3+}$ are components that raise the glass transition temperature and diminish the melting property. By contrast, both above-described components $Zn^{2+}$ and $Mg^{2+}$ lower the glass transition temperature and enhance the melting property. Optional component $Li^+$ is also a component that lowers the glass transition temperature and enhances the melting property. Accordingly, to lower the glass transition temperature and enhance the melting property, in the optical glass according to an aspect of the present invention, the cation ratio of the total content of $Zn^{2+}$, $Mg^{2+}$ and $Li^+$ to the total content of $La^{3+}$, $Gd^{3+}$, $Y^{3+}$, and $Yb^{3+}$ (($Zn^{2+}+Mg^{2+}+Li^+$)/($La^{3+}+Gd^{3+}+Y^{3+}+Yb^{3+}$)) is set to equal to or higher than 0.40. When the cation ratio (($Zn^{2+}+Mg^{2+}+Li^+$)/($La^{3+}+Gd^{3+}+Y^{3+}+Yb^{3+}$)) is lower than 0.40, the glass transition temperature rises. The melting property also decreases and unmelted portions of starting material remain. When the temperature of the glass melt is raised to prevent unmelted portions from remaining, metal melting vessels such as platinum crucibles are corroded by the glass melt, the metal constituting the vessel ionizes and dissolves into the glass melt, and glass coloration intensifies. From the above perspective, the cation ratio (($Zn^{2+}+Mg^{2+}+Li^+$)/($La^{3+}+Gd^{3+}+Y^{3+}+Yb^{3+}$)) desirably falls within a range of equal to or higher than 0.50, preferably within a range of equal to or higher than 0.60, and more preferably within a range of equal to or higher than 0.70. To maintain a high refractive index, the cation ratio (($Zn^{2+}+Mg^{2+}+Li^+$)/($La^{3+}+Gd^{3+}+Y^{3+}+Yb^{3+}$)) is desirably equal to or lower than 2.50, preferably equal to or lower than 2.00, and more preferably, equal to or lower than 1.50.

$Ti^{4+}$, $Nb^{5+}$, $Ta^{5+}$, $W^{6+}$, and $Bi^{3+}$ are components that function to raise the refractive index. When the total content of $Ti^{4+}$, $Nb^{5+}$, $Ta^{5+}$, $W^{6+}$, and $Bi^{3+}$ is lower than 6%, it becomes difficult to achieve the desired refractive index. When the total content of $Ti^{4+}$, $Nb^{5+}$, $Ta^{5+}$, $W^{6+}$, and $Bi^{3+}$ exceeds 45%, resistance to devitrification deteriorates, the precision press molding property deteriorates, the deviation $\Delta Pg$, F of the partial dispersion ratio Pg, F, described further below, increases, and the chromatic aberration correction function decreases. Accordingly, in the optical glass according to an aspect of the present invention, the total content of $Ti^{4+}$, $Nb^{5+}$, $Ta^{5+}$, $W^{6+}$, and $Bi^{3+}$ is set to 6 to 45%. The lower limit of the total content of $Ti^{4+}$, $Nb^{5+}$, $Ta^{5+}$, $W^{6+}$, and $Bi^{3+}$ is desirably 8%, preferably 10%, more preferably 12%, still more preferably 14%, yet more preferably 16%, yet still more preferably 18%, and even more preferably, 20%. The upper limit of the total content of $Ti^{4+}$, $Nb^{5+}$, $Ta^{5+}$, $W^{6+}$, and $Bi^{3+}$ is desirably 40%, preferably 35%, and more preferably, 30%.

When molding a press molding preform (also referred to as a glass material for press molding) comprised of high refractive index glass from a glass melt, the glass surface will sometimes devitrify. This devitrification of the surface is thought to occur in the following manner. Contact between the glass melt and the casting mold rapidly cools the glass surface. Because the thermal conductivity of the glass is low, the interior remains in a high temperature state when the surface cools. Subsequently, the surface of the glass is reheated by thermal conduction from the interior of the glass. At that time, crystals precipitate on the glass surface, causing the surface to devitrify. The greater the volume of glass, the greater the amount of heat in the interior of the glass and the greater the tendency for the temperature on the glass surface to rise due to reheating. Thus, the greater the volume of the molded glass article, the greater the tendency of the surface to devitrify.

It is difficult to adequately inhibit the tendency of the surface to devitrify in this manner simply by adjusting the liquidus temperature. In this regard, $W^{6+}$ functions to inhibit such surface devitrification. In the optical glass according to an aspect of the present invention, from the perspective of obtaining an adequate surface devitrification-inhibiting effect, the content of $W^{6+}$ is set to higher than 5%.

Among components that impart a high refractive index in the form of $Ti^{4+}$, $Nb^{5+}$, $Ta^{5+}$, $W^{6+}$, and $Bi^{3+}$, $Ti^{4+}$ is a component that is effective at maintaining the stability of the glass and inhibiting a rise in the liquidus temperature. However, it is also a component that tends to compromise the precision press molding property. When incorporated in large quantity, dispersion becomes excessively high.

$Nb^{5+}$ is a component that is advantageous for maintaining the precision press molding property. However, it is not necessarily desirable in terms of maintaining the stability of the glass.

$Ta^{5+}$ is a component that is desirable to maintain the stability of the glass and the precision press molding property.

Of the above components imparting a high refractive index, it functions to raise the refractive index without a comparable increase in dispersion.

$W^{6+}$ is an effective component from the perspectives of improving the stability of the glass and inhibiting a rise in the liquidus temperature. However, its effect of enhancing the precision press molding property is weaker than those of $Nb^{5+}$ and $Ta^{5+}$.

$Bi^{3+}$ has weaker effects than the other components that impart a high refractive index in terms of maintaining glass stability and enhancing the precision press molding property.

Accordingly, in the present invention, the following blending proportions are determined for components imparting a high refractive index by taking into account the impact they have on glass stability, the precision press molding property, and the chromatic aberration correction function.

To maintain the stability of the glass, at least either $Ti^{4+}$ or $Ta^{5+}$ is incorporated. That is, the total content of $Ti^{4+}$ and $Ta^{5+}$ is higher than 0%. The lower limit of the total content of $Ti^{4+}$ and $Ta^{5+}$ is desirably 1%, preferably 2%, more preferably 3%, and still more preferably 4%. The upper limit is desirably 23%, preferably 20%, still more preferably 18%, yet more preferably 16%, yet still more preferably 14%, even more preferably 12%, and yet even more preferably, 10%.

In the optical glass according to an aspect of the present invention, as set forth above, the content of $W^{6+}$ is set to higher than 5%. Since $Nb^{5+}$ is an optional component, the lower limit of the total content of $Nb^{5+}$ and $W^{6+}$ is higher than 5%, is desirably 6%, is preferably 7%, and is more preferably 8%.

In the optical glass according to another aspect, at least either $Nb^{5+}$ or $W^{6+}$ is incorporated to maintain the stability of the glass. That is, the total content of $Nb^{5+}$ and $W^{6+}$ is higher than 0%. The lower limit of the total content of $Nb^{5+}$ and $W^{6+}$ is desirably 2%, preferably 4%, more preferably 6%, and still more preferably, 8%.

In the above two aspects, the upper limit of the total content of $Nb^{5+}$ and $W^{6+}$ is desirably 40%, preferably 35%, more preferably 30%, still more preferably 25%, and yet more preferably, 20%.

To maintain the stability of the glass, inhibit a rise in the liquidus temperature, enhance the precision press molding property, and inhibit an increase in deviation $\Delta Pg$, F in the partial dispersion ratio Pg, F, the cation ratio $(Ta^{5+}/(Ti^{4+}+Ta^{5+}))$ is set to equal to or higher than 0.23. The cation ratio $(Ta^{5+}/(Ti^{4+}+Tan))$ desirably falls within a range of 0.25 to 1.00, preferably within a range of 0.30 to 1.00, more preferably within a range of 0.40 to 1.00, still more preferably within a range of 0.50 to 1.00, and yet more preferably within a range of 0.60 to 1.0.

To maintain the stability of the glass and inhibit a rise in the liquidus temperature, the cation ratio $(W^{6+}/(Nb^{5+}+W^{6+}))$ is set to equal to or higher than 0.30. The cation ratio $(W^{6+}/(Nb^{5+}+W^{6}))$ desirably falls within a range of 0.35 to 1.00, preferably within a range of 0.40 to 1.00, more preferably within a range of 0.45 to 1.00, and still more preferably, within a range of 0.50 to 1.00.

When the cation ratio $((Ti^{4+}+Nb^{5+}+Ta^{5+}+W^{6+}+Bi^{3+})/(B^{3+}+Si^{4+}))$ is equal to or lower than 0.37, it becomes difficult to achieve the desired optical characteristics. When it exceeds 3.00, the stability of the glass deteriorates, the liquidus temperature rises, and it becomes difficult to obtain the desired optical characteristics. Thus, the cation ratio $((Ti^{4+}+Nb^{5+}+Ta^{5+}+W^{6+}+Bi^{3+})/(B^{3+}+Si^{4+}))$ is set to higher than 0.37 but equal to or lower than 3.00. The lower limit of the cation ratio $((Ti^{4+}+Nb^{5+}+Ta^{5+}+W^{6+}+Bi^{3+})/(B^{3+}+Si^{4+}))$ is desirably 0.38, preferably 0.39, more preferably 0.40, still preferably 0.41, yet more preferably 0.42, yet still more preferably 0.43, and even more preferably, 0.45. The upper limit of the cation ratio $((Ti^{4+}+Nb^{5+}+Ta^{5+}+W^{6+}+Bi^{3+})/(B^{3+}+Si^{4+}))$ is desirably 2.50, preferably 2.00, more preferably 1.50, still more preferably 1.00, yet more preferably 0.90, and yet still more preferably, 0.80. The refractive index nd and Abbé number vd of the optical glass according to an aspect of the present invention will be described further below.

$Si^{4+}$ is a glass network-forming component that functions to improve the stability of the glass. It also functions to increase the viscosity of the glass and enhance the molding property in the course of molding a molded glass article from a glass melt. However, when the content of $Si^{4+}$ exceeds 10%, the refractive index drops and the glass transition temperature rises, tending to raise the temperature during precision press molding. Accordingly, to enhance the precision press molding property while obtaining the desired optical characteristics, the $Si^{4+}$ content is desirably 0 to 10%. The content of $Si^{4+}$ preferably falls within a range of 0 to 7%, more preferably within a range of 0 to 5%, and still more preferably, within a range of 0 to 3%.

$La^{3+}$ is a component that functions to raise the refractive index without increasing dispersion or the partial dispersion ratio $\Delta Pg$, F. To achieve the above effects, the content of $La^{3+}$ is desirably equal to or higher than 5%. When the $La^{3+}$ content exceeds 50%, the stability of the glass decreases and the glass transition temperature tends to rise. Thus, the $La^{3+}$ content is desirably kept to equal to or lower than 50%. Accordingly, the $La^{3+}$ content desirably falls within a range of 5 to 50%. The lower limit of the $La^{3+}$ content is preferably 10%, preferably 12%, more preferably 14%, and still more preferably, 15%. The upper limit of the $La^{3+}$ content is preferably 45%, more preferably 40%, still more preferably 35%, yet more preferably 30%, yet still more preferably 25%, and even more preferably, 22%.

$Gd^{3+}$ is a component that functions to raise the refractive index without increasing dispersion or the partial dispersion ratio $\Delta Pg$, F. However, when the $Gd^{3+}$ content exceeds 15%, the stability of the glass diminishes and the glass transition temperature tends to rise. Thus, the $Gd^{3+}$ content is desirably kept to 0 to 15%. The $Gd^{3+}$ content preferably falls within a range of 0 to 10%, more preferably within a range of 0 to 8%, still more preferably within a range of 0 to 7%, yet more preferably within a range of 0 to 6%, and yet still more preferably, within a range of 0 to 5%.

$Y^{3+}$ is a component that functions to raise the refractive index without increasing dispersion or the partial dispersion ratio $\Delta Pg$, F. However, when the $Y^{3+}$ content exceeds 15%, the stability of the glass diminishes and the glass transition temperature tends to rise. Thus, the $Y^{3+}$ content is desirably kept to 0 to 15%. The $Y^{3+}$ content preferably falls within a range of 0 to 10%, preferably within a range of 0 to 7%, more preferably within a range of 0 to 5%, and still more preferably within a range of 0 to 3%.

$Yb^{3+}$ is a component that functions to raise the refractive index without increasing dispersion or the partial dispersion ratio $\Delta Pg$, F. However, when the content of $Yb^{3+}$ exceeds 10%, the stability of the glass diminishes and the glass transition temperature tends to rise. Thus, the $Yb^{3+}$ content is desirably kept to 0 to 10%. The $Yb^{3+}$ content preferably falls within a range of 0 to 7%, more preferably within a range of 0 to 5%, still more preferably within a range of 0 to 3%, yet more preferably within a range of 0 to 2%, yet still more preferably within a range of 0 to 1%, and even more preferably, within a range of 0 to 0.1%. It is also possible for no $Yb^{3+}$ to be incorporated.

The Yb content in the optical glass according to an aspect of the present invention, as the content of $Yb_2O_3$ in the glass composition based on oxides, is desirably lower than 2.0 mass %, preferably equal to or lower than 1.9 mass %, still more preferably lower than 1.5 mass %, yet more preferably equal to or lower than 1.4 mass %, yet still more preferably equal to or lower than 1.0 mass %, and even more preferably, equal to or lower than 0.5 mass %. The phrase "glass composition based on oxides" means the glass composition obtained by conversion when the glass starting materials are fully decomposed during melting and present as oxides in the optical glass.

$Ti^{4+}$ is a component that raises the refractive index. However, when the content of $Ti^{4+}$ exceeds 8%, the stability of the glass diminishes, coloration of the glass intensifies, the precision press molding property tends to decrease, and the like. Thus, the $Ti^{4+}$ content desirably falls within a range of 0 to 8%. The upper limit of the $Ti^{4+}$ content is preferably 7.5%, more preferably 7.0%, still more preferably 6.0%, yet more preferably 5.0%, and yet still more preferably, 4.0%. The lower limit of the $Ti^{4+}$ content is desirably 0.5%, preferably 1.0%, and more preferably, 1.5%.

$Nb^{5+}$ is a component that raises the refractive index. However, when the content of $Nb^{5+}$ exceeds 30%, the stability of the glass diminishes and the liquidus temperature tends to rise. Thus, the $Nb^{5+}$ content is desirably kept to 0 to 30%. The lower limit of the $Nb^{5+}$ content is desirably 0.1%, preferably 0.5%, and more preferably 1.0%. The upper limit is preferably 30%, more preferably 25%, still more preferably 20%, yet more preferably 15%, and yet still more preferably, 10%.

$Ta^{5+}$ is a component that raises the refractive index. It exhibits lower dispersion than $Ti^{4+}$ and $W^{6+}$, which are also components that raise the refractive index. However, when $Ta^{5+}$ is incorporated as a glass component, it is possible to raise the refractive index and dispersion of the glass without raising the $\Delta Pg, F$. When the $Ta^{5+}$ content exceeds 15%, the stability of the glass diminishes and the liquidus temperature tends to rise. Accordingly, the $Ta^{5+}$ content is desirably kept to equal to or lower than 15%. The upper limit of the $Ta^{5+}$ content is preferably 13%, more preferably 10%, and still more preferably, 8%. As set forth above, among components that impart a high refractive index, $Ta^{5+}$ is a desirable component for maintaining the precision press molding property. Thus, the $Ta^{5+}$ content is preferably equal to or higher than 0.1%, more preferably equal to or higher than 0.5%, still more preferably equal to or higher than 1.0%, and yet more preferably, equal to or higher than 1.5%.

$W^{6+}$ is a component that functions to raise the refractive index, enhance the stability of the glass, and lower the liquidus temperature. $W^{6+}$ also functions to inhibit devitrification of the surface of the glass, as set forth above. To achieve such effects, in the optical glass of an aspect of the present invention, the content of $W^{6+}$ is set to higher than 5%. The lower limit of the $W^{6+}$ content is desirably 5.5%, preferably 6%, and more preferably, 7%. In another aspect, the lower limit of the $W^{6+}$ content is desirably 3%, preferably 4%, more preferably 5%, still more preferably 6%, and yet more preferably, 7%.

When the content of $W^{6+}$ exceeds 30%, the stability of the glass tends to decrease and the liquidus temperature tends to rise. Coloration of the glass also tends to intensify. Accordingly, the content of $W^{6+}$ is desirably kept to equal to or lower than 30%. The upper limit of the $W^{6+}$ content is preferably 25%, more preferably 20%, still more preferably 18%, yet more preferably 16%, and yet still more preferably, 14%.

$Bi^{3+}$ functions to raise the refractive index and increase the stability of the glass. However, when the content thereof exceeds 10%, the stability of the glass diminishes, the glass develops color, and the precision press molding property tends to deteriorate. The glass sometimes reacts with platinum from the vessel in which the glass is melted (forming an alloy), compromising the platinum. Accordingly, the $Bi^{3+}$ content is desirably kept to 0 to 10%. The $Bi^{3+}$ content preferably falls within a range of 0 to 7%, more preferably within a range of 0 to 5%, still more preferably within a range of 0 to 3%, yet more preferably within a range of 0 to 1%, and yet still more preferably within a range of 0 to 0.1%, with 0% being possible.

$Zr^{4+}$ is a component that functions to raise the refractive index. When the content of $Zr^{4+}$ exceeds 10%, the stability of the glass diminishes and the liquidus temperature tends to rise. Accordingly, the $Zr^{4+}$ content desirably falls within a range of 0 to 10%, preferably within a range of 0 to 5%, and more preferably, within a range of 0 to 3%.

In order to improve the precision press molding property, the cation ratio $((Nb^{5+}+Ta^{5+})/(Ti^{4+}+Nb^{5+}+Ta^{5+}+W^{6+}+Bi^{3+}))$ is desirably kept to equal to or higher than 0.01. To enhance the stability of the glass, the cation ratio $((Nb^{5+}+Ta^{5+})/(Ti^{4+}+Nb^{5+}+Ta^{5+}+W^{6+}+Bi^{3+}))$ is desirably less than 0.7. The lower limit of the cation ratio $((Nb^{5+}+Ta^{5+})/(Ti^{4+}+Nb^{5+}+Ta^{5+}+W^{6+}+Bi^{3+}))$ is preferably 0.05, more preferably 0.10, still more preferably 0.15, yet more preferably 0.20, and yet still more preferably, 0.23.

The upper limit of the cation ratio $((Nb^{5+}+Ta^{5+})/(Ti^{4+}+Nb^{5+}+Ta^{5+}+W^{6+}+Bi^{3+}))$ is preferably 0.68, more preferably 0.66, still more preferably 0.64, yet more preferably, 0.62, and yet still more preferably, 0.60.

When the cation ratio of the content of $Ti^{4+}$ to the total content of $Ti^{4+}$, $Nb^{5+}$, $Ta^{5+}$, $W^{6+}$, and $Bi^{3+}$ $(Ti^{4+}/(Ti^{4+}+Nb^{4+}+Ta^{5+}+W^{6+}+Bi^{3+}))$ exceeds 0.43, the precision press molding property tends to deteriorate, the stability of the glass tends to deteriorate, and the liquidus temperature tends to rise. The deviation $\Delta Pg, F$ in the partial dispersion ratio $Pg, F$ increases, which is undesirable for chromatic aberration correction. Accordingly, the cation ratio $(Ti^{4+}/(Ti^{4+}+Nb^{5+}+Ta^{5+}+W^{6+}+Bi^{3+}))$ is desirably kept to equal to or lower than 0.43. The cation ratio $(Ti^{4+}/(Ti^{4+}+Nb^{5+}+Ta^{5+}+W^{6+}+Bi^{3+}))$ preferably falls within a range of equal to or lower than 0.41, more preferably within a range of equal to or lower than 0.39, still more preferably within a range of equal to or lower than 0.35, yet more preferably within a range of equal to or lower than 0.30, yet still more preferably within a range of equal to or lower than 0.25, and even more preferably, within a range of equal to or lower than 0.20.

The cation ratio of the total content of $Ti^{4+}$, $Nb^{5+}$, $Ta^{5+}$, $W^{6+}$, and $Bi^{3+}$ to the total content of $La^{3+}$, $Gd^{3+}$, $Y^{3+}$, and $Yb^{3+}$ $((Ti^{4+}+Nb^{5+}+Ta^{5+}+W^{6+}+Bi^{3+})/(La^{3+}+Gd^{3+}+Y^{3+}+Yb^{3+}))$ is lower than 0.40, the stability of the glass diminishes and the liquidus temperature tends to rise. Further, it tends to be difficult to achieve desired optical characteristics. When the cation ratio $((Ti^{4+}+Nb^{5+}+Ta^{5+}+W^{6+}+Bi^{3+})/(La^{3+}+Gd^{3+}+Y^{3+}+Yb^{3+}))$ exceeds 4.00, the stability of the glass decreases and the liquidus temperature tends to rise. It also tends to be difficult to achieve desired optical characteristics.

Accordingly, the cation ratio $((Ti^{4+}+Nb^{5+}+Ta^{5+}+W^{6+}+Bi^{3+})/(La^{3+}+Gd^{3+}+Y^{3+}+Yb^{3+}))$ desirably falls within a range of 0.40 to 4.00. The lower limit of the cation ratio $((Ti^{4+}+Nb^{5+}+Ta^{5+}+W^{6+}+Bi^{3+})/(La^{3+}+Gd^{3+}+Y^{3+}+Yb^{3+}))$ is preferably 0.50, more preferably 0.55, still more preferably 0.60, yet more preferably 0.65, and yet still more preferably 0.70. The upper limit is preferably 3.50, more preferably 3.00, still more preferably 2.50, yet more preferably 2.00, and yet still more preferably, 1.50.

Each of $Li^+$, $Na^+$, and $K^+$ functions to lower the glass transition temperature and enhance the glass melting property. However, when the total content of $Li^+$, $Na^+$, and $K^+$ exceeds 10%, the refractive index tends to drop and the stability of the glass tends to diminish. Accordingly, the total content of $Li^+$, $Na^+$, and $K^+$ desirably falls within a range of 0 to 10%, preferably within a range of 0 to 8%, more preferably within a range of 0 to 6%, still more preferably within a range of 0 to 4%, yet more preferably within a range of 0 to 2%, yet still more preferably within a range of 0 to 1%, even more preferably within a range of 0 to 0.5%, and yet even more preferably, within a range of 0 to 0.1%. The total content of $Li^+$, $Na^+$, and $K^+$ can also be 0%.

Each of the alkali metal components will be described next.

$Li^+$ is a component that has an effect of greatly lowering the glass transition temperature while maintaining high refractive index characteristics among the alkali metal components. It also functions to enhance the melting property of the glass. When the content of $Li^+$ exceeds 10%, the refractive index tends to drop and the stability of the glass tends to diminish. Further, $Li^+$ exhibits volatility in a molten state. In the course of preparing a molded glass article from glass melt, it sometimes volatizes from the surface of the glass, causing striae to form. To maintain a high refractive index and obtain an optically homogeneous glass, the $Li^+$ content desirably falls within a range of 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $Li^+$ content can also be 0%.

$Na^+$ is a component that has the effect of lowering the glass transition temperature. It also functions to enhance the melting property of the glass. When the $Na^+$ content exceeds 10%, the refractive index tends to drop and the stability of the glass tends to diminish. Further, since $Na^+$ is volatile in a molten state, in the course of preparing a molded glass article from a glass melt, it sometimes volatizes from the surface of the glass, causing striae to form. To maintain a high refractive index and obtain an optically homogeneous glass, the $Na^+$ content desirable falls within a range of 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $Na^+$ content can also be 0%.

$K^+$ is a component that has the effect of lowering the glass transition temperature. It also functions to enhance the melting property of the glass. When the $K^+$ content exceeds 10%, the refractive index tends to drop and the stability of the glass tends to diminish. Further, since $K^+$ is volatile in a molten state, in the course of preparing a molded glass article from a glass melt, it sometimes volatizes from the surface of the glass, causing striae to form. To maintain a high refractive index and obtain an optically homogeneous glass, the $K^+$ content desirable falls within a range of 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $K^+$ content can also be 0%.

Each of $Mg^{2+}$, $Ca^{2+}$, $Sr^{2+}$, and $Ba^{2+}$ functions to enhance the glass melting property. However, when the total content of $Mg^{2+}$, $Ca^{2+}$, $Sr^{2+}$, and $Ba^{2+}$ exceeds 10%, the stability of the glass diminishes and the liquidus temperature tends to rise. Accordingly, the total content of $Mg^{2+}$, $Ca^{2+}$, $Sr^{2+}$, and $Ba^{2+}$ desirably falls within a range of 0 to 10%, preferably within a range of 0 to 8%, more preferably within a range of 0 to 6%, still more preferably within a range of 0 to 4%, yet more preferably within a range of 0 to 2%, yet still more preferably within a range of 0 to 1%, even more preferably within a range of 0 to 0.5%, and yet even more preferably, within a range of 0 to 0.1%. The total content of $Mg^{2+}$, $Ca^{2+}$, $Sr^{2+}$, and $Ba^{2+}$ can be 0%.

Each of the alkaline earth metal components will be described next.

$Mg^{2+}$ functions to improve the glass melting property. However, when the $Mg^{2+}$ content exceeds 10%, the stability of the glass diminishes and the liquidus temperature tends to rise. Since the refractive index also drops, the $Mg^{2+}$ content is desirably kept to 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $Mg^{2+}$ content can also be 0%.

$Ca^{2+}$ functions to improve the glass melting property. However, when the $Ca^{2+}$ content exceeds 10%, the stability of the glass diminishes and the liquidus temperature tends to rise. Since the refractive index also drops, the $Ca^{2+}$ content is desirably kept to 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $Ca^{2+}$ content can also be 0%.

$Sr^{2+}$ functions to improve the glass melting property. However, when the $Sr^{2+}$ content exceeds 10%, the stability of the glass diminishes and the liquidus temperature tends to rise. Thus, the $Sr^{2+}$ content is desirably kept to 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $Sr^{2+}$ content can also be 0%.

$Ba^{2+}$ functions to improve the glass melting property. However, when the $Ba^{2+}$ content exceeds 10%, the stability of the glass diminishes and the liquidus temperature tends to rise. Thus, the $Ba^{2+}$ content is desirably kept to 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $Ba^{2+}$ content can also be 0%.

$Al^{3+}$ is a component that functions to enhance glass stability and chemical durability. However, when the $Al^{3+}$ content exceeds 10%, the refractive index tends to drop, and the stability of the glass tends to diminish. Thus, the $Al^{3+}$ content is desirably kept to 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $Al^{3+}$ content can also be 0%.

$Te^{4+}$ is a component that functions to raise the refractive index and enhance the stability of the glass. However, when the $Te^{4+}$ content exceeds 10%, the stability of the glass diminishes and the liquidus temperature tends to rise. Thus, the $Te^{4+}$ content is desirably kept to 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, even more preferably within a range of 0 to 0.3%, and yet even more preferably, within a range of 0 to 0.1%. The $Te^{4+}$ content can also be 0%. The $Te^{4+}$ content is desirably reduced out of concern for the burden placed on the environment.

In glass containing equal to or higher than 5% of a total of $Zn^{2+}$ and $Mg^{2+}$ in order to maintain the stability of the glass, the cation ratio of the $Te^{4+}$ content to the total content of $Zn^{2+}$ and $Mg^{2+}$ ($Te^{4+}/(Zn^{2+}+Mg^{2+})$) is desirably lower than 1.0, preferably equal to or lower than 0.5, and more preferably, equal to or lower than 0.1. The Te content, as the content of $TeO_2$ in the glass composition based on oxides, is desirably lower than 1 mol %, preferably equal to or lower than 0.5 mol %, more preferably lower than 0.3 mol %, and still more preferably, lower than 0.1 mol %.

$Ge^{4+}$ is a component that functions to raise the refractive index and enhance the stability of the glass. However, when the $Ge^{4+}$ content exceeds 10%, the stability of the glass tends to diminish. Accordingly, the $Ge^{4+}$ content desirably falls within a range of 0 to 10%, preferably within a range of 0 to 7%, more preferably within a range of 0 to 5%, still more preferably within a range of 0 to 3%, yet more preferably within a range of 0 to 1%, yet still more preferably within a range of 0 to 0.5%, and even more preferably, within a range of 0 to 0.1%. The $Ge^{4+}$ content can also be 0%. Since $Ge^{4+}$ is an extremely expensive component relative to other materials employed as glass components, from the perspective of not greatly increasing manufacturing costs, the quantity employed is desirably kept small.

The content of Ge will be described in terms of a desirable range as the content of $GeO_2$ in the glass composition based on oxides.

To maintain the stability of the glass and inhibit an increase in manufacturing costs, the Ge content, as the $GeO_2$ content in the glass composition based on oxides, is desirably lower than 5.0 mass %, preferably lower than 4 mass %, more preferably lower than 3 mass %, still more preferably lower than 2 mass %, yet more preferably lower than 1 mass %, yet still more preferably equal to or lower than 0.5 mass %, and even more preferably, 0 mass %.

The optical glass according to an aspect of the present invention is oxide glass in which, as set forth above, the principal anion component is $O^{2-}$. Small quantities of halogen components such as $F^-$ and $Cl^-$ can be introduced as anion components in addition to $O^{2-}$. However, when the emphasis is on inhibiting the volatility of the glass melt and facilitating molding, keeping down the content of volatile $F^-$ component that is introduced, that is, not incorporating $F^-$ component, is desirable. Extremely small quantities of halogens such as F and Cl can be added as clarifying agents, not as glass components, to melt the glass.

$Sb_2O_3$, carbonates, sulfates, nitrates, and the like can be added in small quantities as clarifying agents. However, when adding $Sb_2O_3$, because of the strong oxidizing strength of Sb, in order to not facilitate an oxidation-reduction reaction with the molding surface of the pressing mold, the content of $Sb_2O_3$ added as a ratio to the overall content other than $Sb_2O_3$ desirably falls within a range of 0 to 1 mass %, preferably within a range of 0 to 0.5 mass %.

Since Fe, Cr, Co, and Cu color the glass, they are desirably not added. Components that negatively impact the environment such as Pb, Cd, Ti, and As are desirably not incorporated.

Lu and Ga can be incorporated in small quantities to the extent that the object of the present invention is not compromised. However, these components are extremely expensive. Since the object of the present invention can be achieved without their use, Lu and Ga are desirably not incorporated into the glass so as to keep costs down.

Optical Characteristics

The refractive index nd of the optical glass according to an aspect of the present invention is 1.90 to 2.00, and the Abbé number νd satisfies relation (1) below.

$$25 \leq \nu d < (3.91-nd)/0.06 \qquad (1)$$

By keeping the refractive index nd of the glass to equal to or higher than 1.90, it is possible to provide a material for optical elements that enable the imparting of high functionality and a high degree of compactness to image pickup optical systems and projection optical systems. However, when the refractive index nd exceeds 2.00, the stability and the precision press molding property of the glass deteriorate. Thus, the refractive index nd is set to equal to or lower than 2.00.

When the Abbé number νd is less than 25, the deviation ΔPg, F of the partial dispersion ratio Pg, F increases, the chromatic aberration correction function tends to decrease, and the stability and the precision press molding property of the glass tend to deteriorate. Further, when the Abbé number νd is equal to or higher than ((3.91−nd)/0.06), when correcting chromatic aberration by combination with an optical element made of low dispersion glass, the Abbé number cannot differ greatly with the Abbé number of the low dispersion glass, which is undesirable in terms of correcting chromatic aberration. Accordingly, the Abbé number νd satisfies relation (1) above.

In order to provide optical glass that is effective for increasing the functionality and compactness of an optical system, the lower limit of the refractive index is desirably established so as to satisfy relation (2) below, preferably established so as to satisfy relation (3) below, more preferably established so as to satisfy relation (4) below, still more preferably established so as to satisfy relation (5) below, yet more preferably established so as to satisfy relation (6) below, yet still more preferably established so as to satisfy relation (7) below, and even more preferably, established so as to satisfy relation (8) below:

$$nd \geq 2.214 - 0.01 \times \nu d \qquad (2)$$

$$nd \geq 2.218 - 0.01 \times \nu d \qquad (3)$$

$$nd \geq 2.222 - 0.01 \times \nu d \qquad (4)$$

$$nd \geq 2.226 - 0.01 \times \nu d \qquad (5)$$

$$nd \geq 2.230 - 0.01 \times \nu d \qquad (6)$$

$$nd \geq 2.238 - 0.01 \times \nu d \qquad (7)$$

$$nd \geq 2.246 - 0.01 \times \nu d \qquad (8).$$

To maintain the stability of the glass, the refractive index nd is desirably equal to or lower than 1.99, preferably equal to or lower than 1.98, more preferably equal to or lower than 1.97, and still more preferably, equal to or lower than 1.96.

To inhibit an increase in ΔPg, F while maintaining the stability and the precision press molding property of the glass, the Abbé number νd is desirably equal to or higher than 25.5, preferably equal to or higher than 26.0, more preferably equal to or higher than 27.0, and more preferably equal to or higher than 27.5.

For the reasons set forth above, the upper limit of the Abbé number νd is desirably established so as to satisfy relation (9)

below, preferably established so as to satisfy relation (10) below, and more preferably, established so as to satisfy relation (11) below:

$$vd<(3.90-nd)/0.06 \quad (9)$$

$$vd<(3.89-nd)/0.06 \quad (10)$$

$$vd<(3.88-nd)/0.06 \quad (11).$$

In the optical glass according to an aspect of the present invention, it is possible to exhibit a low partial dispersion ratio while having the above Abbé number vd. Thus, the optical glass is suitable as the material for an optical element that is effective for high-order chromatic aberration correction. In this context, the partial dispersion ratio Pg, F is denoted by (ng−nF)/(nF−nc) using the various refractive indexes ng, nF, and nc at spectral lines g, F, and c. In the present invention, ng, nF, and nc are values obtained by the method indicated in Examples set forth further below.

In a partial dispersion ratio Pg, F−Abbé number vd plot, when the partial dispersion ratio on the normal line serving as a reference for normal partial dispersion glass is denoted as Pg, F(0), Pg, F(0) is given by the following equation using the Abbé number vd:

$$Pg,F(0)=0.6483-(0.0018 \times vd).$$

The deviation ΔPg, F in the partial dispersion ratio Pg, F is the deviation of the partial dispersion ratio Pg, F from the normal line. It is given by the following equation:

$$\Delta Pg,F=Pg,F-Pg,F(0)=Pg,F+(0.0018 \times vd)-0.6483.$$

To enhance the high-order chromatic aberration correction function, ΔPg, F is desirably kept to equal to or lower than 0.0150, preferably to equal to or lower than 0.0100, more preferably to equal to or lower than 0.0080, still more preferably to equal to or lower than 0.0060, yet more preferably to equal to or lower than 0.0040, yet still more preferably to equal to or lower than 0.0020, and even more preferably, to equal to or lower than 0.0010.

However, when ΔPg, F is rendered excessively low, it becomes difficult to obtain glass with the desired refractive index and Abbé number as well as the stability of the glass tends to decrease. Thus, ΔPg, F is desirably equal to or higher than −0.0060, preferably equal to or higher than −0.0055, more preferably equal to or higher than −0.0050, still more preferably equal to or higher than −0.0045, yet more preferably equal to or higher than −0.0040, and yet still more preferably, equal to or higher than −0.0030.

Transmittance Characteristics

The optical glass according to an aspect of the present invention can exhibit high optical transmittance over a broad wavelength range of the visible range while being high refractive index glass. In a desirable embodiment of the optical glass according to an aspect of the present invention, coloration is exhibited at a λ70 of equal to or lower than 500 nm. The λ70 range is preferably equal to or lower than 480 nm, more preferably equal to or lower than 460 nm, and still more preferably, equal to or lower than 450 nm. The lower limit of λ70 is not specifically defined. 350 nm can be thought of as a yardstick for the lower limit of λ70. In this context, the term "λ70" is the wavelength at which light transmittance over the wavelength range of 280 to 700 nm becomes 70%. The term "light transmittance" refers to the spectral transmittance obtained by directing light perpendicularly onto the polished surface of a glass sample having mutually parallel surfaces that have been polished to a thickness of 10.0±0.1 mm. That is, it refers to $I_{out}/I_{in}$ where $I_{in}$ denotes the intensity of the light incident on the sample and $I_{out}$ denotes the intensity of the light passing through the sample. The spectral transmittance includes reflection losses of light on the sample surface. The term "polished" means smoothed to a state where the surface roughness is quite low relative to wavelengths in the measured wavelength region. The optical glass according to an aspect of the present invention desirably exhibits a light transmittance exceeding 70% in the visible range to the longer wavelength side of λ70.

In the same manner as for λ70, λ5 can be defined as follows. λ5 is the wavelength at which spectral transmittance becomes 5%. The λ5 range is desirably equal to or lower than 400 nm, preferably equal to or lower than 390 nm, more preferably equal to or lower than 380 nm, still more preferably equal to or lower than 370 nm. The lower limit of λ5 is not specifically defined. 300 nm can be thought of as a yardstick for the lower limit of λ5.

The spectral transmittance is measured over a wavelength range of 280 to 700 nm as set forth above. The light transmittance normally increases as the wavelength increases from λ5, and from λ70 to a wavelength of 700 nm, a high transmittance of equal to or higher than 70% is normally maintained.

Glass Transition Temperature

The optical glass according to an aspect of the present invention can exhibit a low glass transition temperature while being high refractive index glass. It is thus suitable as glass for precision press molding. In a desirable embodiment of the optical glass according to an aspect of the present invention, the glass transition temperature is equal to or lower than 650° C. With optical glass with a glass transition temperature of equal to or lower than 650° C., it is possible to keep the temperature of the glass within a relatively low temperature range during precision press molding, inhibit the reaction between the glass and the press molding surfaces during press molding, and maintain a good state of the precision press molding property. From such a perspective, the glass transition temperature is desirably kept to equal to or lower than 640° C., preferably kept to equal to or lower than 630° C., more preferably kept to equal to or lower than 620° C., still more preferably kept to equal to or lower than 610° C., and yet more preferably, kept to equal to or lower than 600° C.

When the glass transition temperature is rendered excessively low, the stability of the glass tends to diminish and the refractive index tends to drop. Thus, the glass transition temperature is desirably kept to equal to or higher than 500° C., preferably kept to equal to or higher than 520° C., more preferably kept to equal to or higher than 540° C., still more preferably kept to equal to or higher than 560° C., and yet more preferably, kept to equal to or higher than 570° C.

Liquidus Temperature

The optical glass according to an aspect of the present invention can exhibit good thermal stability due to the composition set forth above. In a desirable embodiment, the liquidus temperature, which serves as an index of thermal stability, is equal to or lower than 1,300° C. When the liquidus temperature is low, a rise in the melting temperature can be inhibited while preventing devitrification, the corrosion of melting vessels made of platinum, platinum alloys, or the like by the glass melt can be inhibited, and coloration of the glass due to contamination by foreign matter such as platinum or dissolved platinum ions can be inhibited. In addition, since the temperature of the glass melt that flows out can be reduced, the formation of striae can be prevented and the molding of optically homogeneous glass can be facilitated. The upper limit of the liquidus temperature is preferably 1,250° C., more preferably 1,200° C., still more preferably 1,150° C., yet more preferably 1,130° C., and yet still more preferably, 1,100° C. However, when the liquidus temperature is rendered excessively low, the refractive index tends to drop and the glass transition temperature tends to rise. Thus, the liquidus temperature is preferably kept to equal to or higher than 1,000° C., more preferably kept to equal to or higher than 1,020° C., and still more preferably, kept to equal to or higher than 1,030° C.

Specific Gravity

In an optical system, reduction in the weight of the optical elements constituting the optical system is desirable in addition to compactness. The optical glass according to an aspect of the present invention is high refractive index optical glass. However, it can exhibit a relatively low specific gravity for high refractive index glass, which is advantageous to weight reduction. In a desirable embodiment of the optical glass according to an aspect of the present invention, the specific gravity of the glass is equal to or lower than 6.5. The upper limit of the specific gravity is preferably 6.3, more preferably 6.0, still more preferably 5.9, yet more preferably 5.8, and yet still more preferably, 5.7.

However, when the specific gravity is rendered excessively low, the stability of the glass tends to diminish and the refractive index tends to drop. The lower limit of the specific gravity is desirably 4.5, preferably, 4.7, more preferably 4.9, still more preferably 5.0, yet more preferably 5.1, and yet still more preferably, 5.2.

The optical glass according to another aspect that is provided is optical glass, which is oxide glass comprising, denoted as cation %, a total of 5 to 60% of $B^{3+}$ and $Si^{4+}$, with 5 to 50% of $B^{3+}$, 5 to 40% of $Zn^{2+}$, a total of 10 to 50% of $La^{3+}$, $Gd^{3+}$, $Y^{3+}$, and $Yb^{3+}$, and a total of 5 to 45% of $Ti^{4+}$, $Nb^{5+}$, $Ta^{5+}$, $W^{6+}$, and $Bi^{3+}$, with a total content of $Ti^{4+}$ and $Ta^{5+}$ being higher than 0% and a total content of $Nb^{5+}$ and $W^{6+}$ being higher than 0%;

wherein a cation ratio of a content of $Ta^{5+}$ to a total content of $Ti^{4+}$ and $Ta^{5+}$, $Ta^{5+}/(Ti^{4+}+Ta^{5+})$, is equal to or higher than 0.23;

a cation ratio of a content of $W^{6+}$ to a total content of $Nb^{5+}$ and $W^{6+}$, $W^{6+}/(Nb^{5+}+W^{6+})$, is equal to or higher than 0.30;

a cation content of a total content of $Ti^{4+}$, $Nb^{5+}$, $Ta^{5+}$, $W^{6+}$, and $Bi^{3+}$ to a total content of $B^{3+}$ and $Si^{4+}$, $(Ti^{4+}+Nb^{5+}+Ta^{5+}+W^{6+}+Bi^{3+})/(B^{3+}+Si^{4+})$, is higher than 0.37 but equal to or lower than 3.00; and which has a refractive index nd ranging from 1.90 to 2.00 and an Abbé number νd satisfying equation (1):

$$25 \leq \nu d < (3.91-nd)/0.06 \quad (1).$$

For a detailed description, reference can be made to the description of the optical glass according to an aspect of the present invention set forth above.

Manufacturing Optical Glass

The optical glass according to an aspect of the present invention can be manufactured by weighing out and blending starting materials in the form of oxides, carbonates, sulfates, nitrates, hydroxides, and the like so as to obtain the targeted glass composition; thoroughly mixing to obtain a mixed batch; heating, melting, defoaming, and stirring the mixed batch in a melting vessel to prepare a homogeneous glass melt containing no bubbles; and molding the glass melt. Specifically, known melting methods can be used in manufacturing.

[Precision Press Molding Preform]

The precision press molding preform according to an aspect of the present invention will be described next.

The precision press molding preform according to an aspect of the present invention is comprised of the optical glass according to an aspect of the present invention set forth above.

The precision press molding preform (referred to hereinafter as the "preform") means a glass gob that is supplied to precision press molding in the form of a molded glass article having a mass corresponding to the mass of a precision press-molded article. The preform will be described in detail below.

The preform means a preformed glass article that is heated and supplied to precision press molding. In this context, "precision press molding," which is also called mold optics molding as is widely known, is a method of forming the optically functional surfaces of an optical element by transferring the molding surface of a pressing mold. An "optically functional surface" means a surface that refracts, reflects, diffracts, or effects the entry or exit of light that is being controlled in an optical element. The lens surface of a lens corresponds to an optically functional surface.

To cause the glass to extend well along the molding surface while preventing reaction and fusion between the glass and the molding surface of the pressing mold during precision press molding, the surface of the preform is desirably coated with a mold release film. Examples of types of mold release films are noble metals (platinum, platinum alloys), oxides (oxides of Si, Al, Zr, La, Y, and the like), nitrides (nitrides of B, Si, Al, and the like), and carbon-containing films.

Carbon-containing films the principal components of which is carbon (with a carbon content that is higher than the content of the other elements when the elemental contents of the film are expressed as atom %) are desirable. Specific examples are carbon films and hydrocarbon films. A known method such as vacuum vapor deposition, sputtering, or ion plating employing a carbon starting material, or a known method such as thermal decomposition employing a material gas such as a hydrocarbon, can be used as the method of forming the carbon-containing film. Other films can be formed by vapor deposition, sputtering, ion plating, the sol-gel method, and the like.

The preform is manufactured by the steps of heating and melting the glass starting materials to prepare a glass melt, and then molding the glass melt.

The first example of manufacturing a preform is a method whereby a glass melt gob of prescribed weight is separated from a glass melt and cooled to form a preform with a mass equal to that of the glass melt gob. For example, the glass starting materials are melted, clarified, and homogenized to prepare a homogeneous glass melt. This glass melt is then caused to flow out of a temperature-adjusted outflow nozzle or an outflow pipe made of platinum or a platinum alloy. When molding small preforms or spherical preforms, the glass melt is dripped out of the outflow nozzle in the form of drops of glass melt of desired mass, which are then received by preform-molding molds and shaped into preforms. Alternatively, the glass melt drops of desired mass are similarly caused to drip out of the outflow nozzle in liquid nitrogen or the like to shape preforms. When manufacturing medium and large preforms, the glass melt flow is caused to flow out of the outflow pipe, the tip portion of the glass melt flow is received in a preform-molding mold, a constriction is formed between the nozzle of the glass melt flow and the preform-molding mold, the preform-molding mold is rapidly moved straight down, the surface tension of the glass melt causes the glass melt flow to separate at the constriction, a glass melt gob of desired mass is received in a receiving member, and a preform is molded. Alternatively, while the glass gob is in a soft state, it can be pressed in a preform-molding mold and molded into a preform with a smooth surface having a shape resembling the shape of the optical element that is to be obtained by precision press molding, To manufacture a preform having a smooth surface free of scratches, grime, wrinkles, surface distortion, and the like, such as a preform with a free surface, a method can be employed such as applying air pressure to a glass melt gob on a preform-molding mold and molding the preform while it is being floated, or cooling a gas substance such as liquid nitrogen at ordinary temperature and ordinary pressure, dripping glass melt drops into the liquefied medium, and molding a preform.

When molding a preform while floating a glass melt gob, the glass melt gob is subjected to upward air pressure by blowing a gas (called a floating gas) against the glass melt gob. In this process, when the viscosity of the glass melt gob drops excessively, the floating gas enters the glass, and ends up remaining in the preform as bubbles. However, by keeping the viscosity of the glass melt gob to 3 to 60 dPa·s, the glass gob can be floated without causing floating gas to enter into the glass.

Air, $N_2$ gas, $O_2$ gas, Ar gas, He gas, steam, or the like can be employed as the gas used as the floating gas blown against the preform. The air pressure is not specifically limited other than that it float the preform without the preform coming into contact with anything solid such as the surface of the mold.

Many of the precision press-molded articles, (such as optical elements) that are manufactured from preforms have rotational axes of symmetry, such as lenses. Thus, the shape of the preform desirably has a rotational axis of symmetry.

The second example of manufacturing a preform is a method whereby a homogenous glass melt is cast into a casting mold and molded. Distortion is removed from the molded article by annealing. The molded article is cut or severed to divide it into desired dimensions and shape, and multiple pieces of glass are manufactured. These glass pieces are polished to render the surface smooth, yielding preforms comprised of glass of desired mass. The surface of the preform that is manufactured in this manner is also desirably coated with a carbon-containing film for use.

[Optical Element]

An optical element according to an aspect of the present invention will be described next.

The optical element according to an aspect of the present invention is comprised of the optical glass according to an aspect of the present invention. Specific examples are lenses such as aspherical lenses, spherical lenses, plano-concave lenses, plano-convex lenses, biconcave lenses, biconvex lenses, convex meniscus lenses, and concave meniscus lenses; microlenses; lens arrays; lenses with refraction gratings; prisms; prisms with lens functions. As needed, an antireflective film or a wavelength-selective partially reflective film can be provided on the surface, The optical glass according to an aspect of the present invention is glass having a high refractive index and high dispersion, and it can be glass with a low ΔPg, F. Thus, the optical element of the present invention comprised of the above optical glass can be combined with an optical element comprised of some other glass to correct high-order chromatic aberration. Since the optical element according to an aspect of the present invention is comprised of glass with a high refractive index, it can be used in image pickup optical systems, projection optical systems, and the like to achieve a compact optical system.

[Method of Manufacturing an Optical Element]

The method of manufacturing an optical element according to an aspect of the present invention will be described next.

The method of manufacturing an optical element according to an aspect of the present invention comprises the steps of heating the precision press molding preform according to an aspect of the present invention set forth above; and using a pressing mold to conduct precision press molding to obtain an optical element.

The step of heating the pressing mold and preform and the pressing step are desirably conducted in a non-oxidizing gas atmosphere, such as nitrogen gas, or a mixed gas of nitrogen gas and hydrogen gas, to prevent oxidizing of the molding surface of the pressing mold and of the mold release film provided on the molding surface. When employing a non-oxidizing gas atmosphere, the carbon-containing film coating the preform surface will also remain on the surface of the precision press-molded article without being oxidized. Although this film should be finally removed, it suffices to heat the precision press-molded article in an oxidizing atmosphere, such as air, to relatively easily and completely remove the carbon-containing film. Oxidizing and removing the carbon-containing film should be conducted at a temperature that does not cause the precision press-molded article to deform due to being heated. Specifically, they are conducted within a temperature range of lower than the glass transition temperature.

In precision press molding, the preform can be introduced into the pressing mold and heated along with the pressing mold, or a preheated preform can be introduced into a pressing mold, desirably a preheated pressing mold, to conduct precision press molding.

In either case, a pressing mold that has been machined to high precision in advance to impart a desired shape to the molding surface is employed. A film for improving the sliding property during press molding can be formed on the glass. Examples of such films are carbon-containing films, nitride films, and noble metal films. Films such as hydrogenated carbon films and carbon films are desirable as carbon-containing films. In the precision press molding relating to the former embodiment, it is possible to position the preform between a pair of opposed molds including an upper mold and a lower mold with molding surfaces that have been machined into precise shapes, heat both the molds and the preform to a temperature desirably corresponding to a glass viscosity of $10^5$ to $10^9$ dPa·s to soften the preform, and apply pressure to mold the preform by precisely transferring the molding surface of the pressing mold to the glass.

In the latter embodiment of precision press molding, a preform that has been preheated to a temperature desirably corresponding to a glass viscosity of $10^4$ to $10^8$ dPa·s is positioned between a pair of opposed molds including an upper mold and a lower mold with molding surfaces that have been machined into precise shapes, and pressure is applied to mold the preform by precisely transferring the molding surface of the pressing mold to the glass.

The pressure and duration of the application of pressure can be suitably determined taking into account the viscosity of the glass and the like. For example, a press pressure of about 5 to 15 MPa and a duration of 10 to 300 seconds can be employed. Pressing conditions such as the duration and pressure can be suitably set within known ranges in line with the shape and dimensions of the molded article.

Subsequently, the pressing mold and the precision press-molded article are cooled. Desirably, when they reach a temperature below the distortion point, the mold is opened and the precision press-molded article is removed. To achieve optical characteristics that precisely correspond to desired values, it suffices to adjust the annealing conditions during cooling of the molded article, such as the annealing rate.

The method of the former embodiment of precision press molding is recommended when emphasizing the enhancement of molding precision, such as surface precision and eccentricity precision. The method of the latter embodiment of precision press molding is recommended when emphasizing productivity.

The optical element according to an aspect of the present invention can be manufactured without a press molding step. For example, a homogeneous glass melt can be cast into a casting mold, a glass block can be molded, the glass block can be annealed to remove distortion, and the annealing conditions can be adjusted to achieve glass with a desired refractive index value in optical characteristic adjustment. Subsequently, the glass block can be cut or severed to obtain glass pieces, which can then be ground and/or polished into finished optical elements.

EXAMPLES

The present invention is further described below through Examples. However, the present invention is not limited to the embodiments given in Examples. By referencing Examples set forth below and applying the methods of adjusting the contents of the various glass components set forth above, it is possible to obtain the optical glass according to an aspect of the present invention.

Example 1

Starting material powders in the form of nitrates, sulfates, hydroxides, oxides, boric acid, and the like were first weighed out and thoroughly mixed in a manner calculated to yield oxide glass having the composition (denoted as cation %) of type 43 indicated in Table 1 to obtain a blended starting material. The blended starting material was charged to a crucible made of platinum or a platinum alloy, heated to 1,300° C., melted, clarified, and stirred, yielding a homogeneous glass melt.

The glass melt was caused to flow into a preheated casting mold, rapidly cooled, and maintained for 2 hours at a temperature near the glass transition temperature. It was then gradually cooled to obtain the oxide glass of type 43 having the composition indicated in Table 1. No optically nonhomogeneous portion such as precipitation of crystals, contamination with foreign matter such as platinum inclusion, or striae was observed in any of the glass prepared.

The entire anion component of each of the oxide glass indicated in Table 1 was $O^{2-}$. The glass compositions based on oxides of the above glasses are given in Table 2 as mol % and in Table 3 as mass %. The glass compositions indicated in Tables 2 and 3 have been calculated based on the glass compositions indicated in Table 1.

The characteristics of each glass were measured by the methods indicated below. The measurement results are given in Table 1.

(1) Refractive index nd and Abbé number vd

These were measured for optical glass that was cooled at a rate of 30° C. per hour.

(2) Partial dispersion ratio Pg, F, and deviation ΔPg, F from the normal line of the partial dispersion ratio The partial dispersion ratio Pg, F was calculated from values of refractive indexes ng, nF, and nc measured in optical glass cooled at a rate of 30° C. per hour.

The deviation ΔPg, F from the normal line of the partial dispersion ratio was calculated from the partial dispersion ratio Pg, F(0) on the normal line calculated from the partial dispersion ratio Pg, F and the Abbé number vd.

(3) Glass transition temperature Tg

This was measured under conditions of a temperature increase of 10° C./minute with a differential scanning calorimeter (DSC).

(4) Liquidus temperature

This was measured by maintaining the glass for 2 hours in a furnace heated to a prescribed temperature, cooling the glass, and observing the interior of the glass with an optical microscope at 100-fold magnification to determine the liquidus temperature from the presence or absence of crystals.

(5) Specific gravity

This was measured by Archimedes' method.

(6) λ70, λ5

A glass sample having mutually parallel surfaces polished to a thickness of 10.0±0.1 mm was employed. Light with an intensity of $I_{in}$ was caused to perpendicularly enter the polished surface, the light of intensity $I_{out}$ that passed through the sample was measured with a spectrophotometer, and the light transmittance $I_{out}/I_{in}$ was calculated. The wavelength at which the light transmittance became 70% was adopted as λ70, and the wavelength at which the light transmittance became 5% as λ5.

(7) Surface devitrification test

A metal material that had been maintained at room temperature was brought into contact with a glass melt that was at a temperature falling within a temperature range of equal to or higher than the temperature of 50° C. lower than the liquidus temperature but equal to or lower than the temperature of 50° C. higher than the liquidus temperature. The glass was cooled and solidified. The spot where the glass had been brought into contact with the metal material was magnified and observed by an optical microscope (at 100-fold magnification). The number of crystals that had precipitated on the glass surface was counted and the number of crystals (surface density) per unit surface area was calculated.

The glass sample was an approximate rectangular parallelepiped measuring 25 mm×20 mm×15 mm (with a volume of about 7,500 $mm^3$).

Table 1 gives the surface densities of the number of crystals in the surface devitrification test for each glass. The smaller the value, the greater the degree to which surface devitrification was inhibited.

(8) Test of fusion to test panel

A piece of glass was placed on the smooth surface of a test panel having a smooth surface and being constituted with a material with a carbon content of equal to or higher than 50 atom %. The glass and the test panel were heated, the temperature was maintained at that heating temperature, and the glass and the test panel were cooled to room temperature. A check was then made for fusion of the test panel and the glass. The heating temperature of the glass was the temperature at which the viscosity of the glass became $10^7$ dPa·s. The temperature was maintained for 20 minutes.

No fusion of any of the glass to the test panel was observed when fusion tests with the test panel were conducted for each of the glass indicated in Table 1.

TABLE 1

| | No. | 1 Cation % | 2 Cation % | 3 Cation % | 4 Cation % | 5 Cation % | 6 Cation % | 7 Cation % |
|---|---|---|---|---|---|---|---|---|
| Cation % | $Si^{4+}$ | 4.00 | 2.00 | 2.04 | 0.33 | 0.33 | 2.33 | 1.08 |
| | $B^{3+}$ | 34.00 | 36.00 | 34.70 | 34.55 | 36.55 | 32.55 | 35.05 |
| | $Zn^{2+}$ | 22.00 | 23.00 | 23.47 | 19.77 | 17.77 | 19.77 | 18.52 |
| | $La^{3+}$ | 18.00 | 17.00 | 17.35 | 18.60 | 18.60 | 18.60 | 18.60 |
| | $Gd^{3+}$ | 6.00 | 6.00 | 3.06 | 0.00 | 0.00 | 0.00 | 0.00 |
| | $Y^{3+}$ | 0.00 | 0.00 | 0.00 | 1.16 | 1.16 | 1.16 | 1.16 |
| | $Yb^{3+}$ | 0.00 | 0.00 | 0.00 | 0.00 | 0.00 | 0.00 | 0.00 |
| | $Zr^{4+}$ | 0.00 | 0.00 | 2.04 | 2.33 | 2.33 | 2.33 | 2.33 |
| | $Ti^{4+}$ | 6.00 | 4.00 | 2.04 | 2.33 | 2.33 | 2.33 | 4.33 |
| | $Nb^{5+}$ | 0.00 | 0.00 | 3.06 | 6.98 | 6.98 | 6.98 | 4.98 |
| | $Ta^{5+}$ | 2.00 | 4.00 | 4.08 | 4.65 | 4.65 | 4.65 | 4.65 |
| | $W^{6+}$ | 8.00 | 8.00 | 8.16 | 9.30 | 9.30 | 9.30 | 9.30 |
| | $Bi^{3+}$ | 0.00 | 0.00 | 0.00 | 0.00 | 0.00 | 0.00 | 0.00 |
| | $Li^{+}$ | 0.00 | 0.00 | 0.00 | 0.00 | 0.00 | 0.00 | 0.00 |
| | $Na^{+}$ | 0.00 | 0.00 | 0.00 | 0.00 | 0.00 | 0.00 | 0.00 |
| | $K^{+}$ | 0.00 | 0.00 | 0.00 | 0.00 | 0.00 | 0.00 | 0.00 |
| | $Mg^{2+}$ | 0.00 | 0.00 | 0.00 | 0.00 | 0.00 | 0.00 | 0.00 |
| | $Ca^{2+}$ | 0.00 | 0.00 | 0.00 | 0.00 | 0.00 | 0.00 | 0.00 |
| | $Sr^{2+}$ | 0.00 | 0.00 | 0.00 | 0.00 | 0.00 | 0.00 | 0.00 |
| | $Ba^{2+}$ | 0.00 | 0.00 | 0.00 | 0.00 | 0.00 | 0.00 | 0.00 |
| | $Ge^{4+}$ | 0.00 | 0.00 | 0.00 | 0.00 | 0.00 | 0.00 | 0.00 |
| | Total | 100.00 | 100.00 | 100.00 | 100.00 | 100.00 | 100.00 | 100.00 |
| | $B^{3+} + Si^{4+}$ | 38.00 | 38.00 | 36.74 | 34.88 | 36.88 | 34.88 | 36.13 |
| | $La^{3+} + Gd^{3+} + Y^{3+} + Yb^{3+}$ | 24.00 | 23.00 | 20.41 | 19.76 | 19.76 | 19.76 | 19.76 |
| | $Gd^{3+} + Y^{3+} + Yb^{3+}$ | 6.00 | 6.00 | 3.06 | 1.16 | 1.16 | 1.16 | 1.16 |
| | $Ti^{4+} + Nb^{5+} + Ta^{5+} + W^{6+} + Bi^{3+}$ | 16.00 | 16.00 | 17.34 | 23.26 | 23.26 | 23.26 | 23.26 |
| | $Ti^{4+} + Ta^{5+}$ | 8.00 | 8.00 | 6.12 | 6.98 | 6.98 | 6.98 | 8.98 |
| | $Nb^{5+} + W^{6+}$ | 8.00 | 8.00 | 11.22 | 16.28 | 16.28 | 16.28 | 14.28 |
| | $Zn^{2+} + Mg^{2+}$ | 22.00 | 23.00 | 23.47 | 19.77 | 17.77 | 19.77 | 18.52 |
| | $Li^{+} + Na^{+} + K^{+}$ | 0.00 | 0.00 | 0.00 | 0.00 | 0.00 | 0.00 | 0.00 |
| Cation ratio | $Ti^{4+}/(Ti^{4+} + Nb^{5+} + Ta^{5+} + W^{6+} + Bi^{3+})$ | 0.38 | 0.25 | 0.12 | 0.10 | 0.10 | 0.10 | 0.19 |
| | $(Nb^{5+} + Ta^{5+})/(Ti^{4+} + Nb^{5+} + Ta^{5+} + W^{6+} + Bi^{3+})$ | 0.13 | 0.25 | 0.41 | 0.50 | 0.50 | 0.50 | 0.41 |
| | $(Ti^{4+} + Nb^{5+} + Ta^{5+} + W^{6+} + Bi^{3+})/(B^{3+} + Si^{4+})$ | 0.42 | 0.42 | 0.47 | 0.67 | 0.63 | 0.67 | 0.64 |
| | $(Ti^{4+} + Nb^{5+} + Ta^{5+} + W^{6+} + Bi^{3+})/(La^{3+} + Gd^{3+} + Y^{3+} + Yb^{3+})$ | 0.67 | 0.70 | 0.85 | 1.18 | 1.18 | 1.18 | 1.18 |
| | $(Zn^{2+} + Mg^{2+} + Li^{+})/(La^{3+} + Gd^{3+} + Y^{3+} + Yb^{3+})$ | 0.92 | 1.00 | 1.15 | 1.00 | 0.90 | 1.00 | 0.94 |
| | $Si^{4+}/Bi^{+}$ | 0.12 | 0.06 | 0.06 | 0.01 | 0.01 | 0.07 | 0.03 |
| | $Ta^{5+}/(Ti^{4+} + Ta^{5+})$ | 0.25 | 0.50 | 0.67 | 0.67 | 0.67 | 0.67 | 0.52 |
| | $W^{6+}/(Nb^{5+} + W^{6+})$ | 1.00 | 1.00 | 0.73 | 0.57 | 0.57 | 0.57 | 0.65 |
| Anion % | $O^{2-}$ | 100.00 | 100.00 | 100.00 | 100.00 | 100.00 | 100.00 | 100.00 |
| Characteristics | nd | 1.911 | 1.909 | 1.921 | 1.954 | 1.947 | 1.950 | 1.950 |
| | υd | 32.2 | 32.7 | 32.1 | 29.7 | 29.8 | 29.8 | 29.6 |
| | (3.91 − nd)/0.06 | 33.3 | 33.4 | 33.2 | 32.6 | 32.7 | 32.7 | 32.7 |
| | $P_{g,F}$ | 0.5929 | 0.5876 | 0.5909 | 0.5961 | 0.5971 | 0.5961 | 0.5988 |
| | $\Delta P_{g,f}$ | 0.0025 | −0.0018 | 0.0004 | 0.0013 | 0.0025 | 0.0015 | 0.0037 |
| | Specific gravity | 5.42 | 5.53 | 5.46 | 5.45 | 5.40 | 5.43 | 5.40 |
| | Tg(° C.) | 590 | 586 | 590 | 588 | 590 | 591 | 592 |
| | Liquidus temperature (° C.) | 1050 | 1060 | 1130 | 1100 | 1070 | 1070 | 1100 |
| | λ70(nm) | 407 | 402 | 403 | 424 | 426 | 420 | 443 |
| | λ5(nm) | 360 | 358 | 358 | 364 | 364 | 363 | 366 |
| Number density of surface crystals in surface devitrification test | | 100 or less | 100 or less | 100 or less | 2000 or less | 2000 or less | 100 or less | 100 or less |

| | No. | 8 Cation % | 9 Cation % | 10 Cation % | 11 Cation % | 12 Cation % | 13 Cation % | 14 Cation % |
|---|---|---|---|---|---|---|---|---|
| Cation % | $Si^{4+}$ | 1.08 | 2.38 | 2.24 | 2.42 | 2.24 | 2.37 | 2.24 |
| | $B^{3+}$ | 35.05 | 33.34 | 31.30 | 33.93 | 31.30 | 33.23 | 31.29 |
| | $Zn^{2+}$ | 18.52 | 20.24 | 19.01 | 20.59 | 19.01 | 20.17 | 19.01 |
| | $La^{3+}$ | 18.60 | 19.05 | 17.89 | 19.38 | 17.89 | 18.98 | 17.89 |
| | $Gd^{3+}$ | 0.00 | 0.00 | 0.00 | 0.00 | 0.00 | 0.00 | 0.00 |
| | $Y^{3+}$ | 1.16 | 1.19 | 1.12 | 1.21 | 1.12 | 1.19 | 1.12 |
| | $Yb^{3+}$ | 0.00 | 0.00 | 0.00 | 0.00 | 0.00 | 0.00 | 0.00 |
| | $Zr^{4+}$ | 2.33 | 2.38 | 2.24 | 2.42 | 2.24 | 2.37 | 2.24 |
| | $Ti^{4+}$ | 6.33 | 0.00 | 6.08 | 2.42 | 2.24 | 2.37 | 2.24 |
| | $Nb^{5+}$ | 2.98 | 7.14 | 6.71 | 3.10 | 10.55 | 7.12 | 6.71 |
| | $Ta^{5+}$ | 4.65 | 4.76 | 4.47 | 4.84 | 4.47 | 4.75 | 4.47 |
| | $W^{6+}$ | 9.30 | 9.52 | 8.94 | 9.69 | 8.94 | 7.45 | 12.79 |
| | $Bi^{3+}$ | 0.00 | 0.00 | 0.00 | 0.00 | 0.00 | 0.00 | 0.00 |
| | $Li^{+}$ | 0.00 | 0.00 | 0.00 | 0.00 | 0.00 | 0.00 | 0.00 |
| | $Na^{+}$ | 0.00 | 0.00 | 0.00 | 0.00 | 0.00 | 0.00 | 0.00 |
| | $K^{+}$ | 0.00 | 0.00 | 0.00 | 0.00 | 0.00 | 0.00 | 0.00 |

TABLE 1-continued

| | | | | | | | | |
|---|---|---|---|---|---|---|---|---|
| | $Mg^{2+}$ | 0.00 | 0.00 | 0.00 | 0.00 | 0.00 | 0.00 | 0.00 |
| | $Ca^{2+}$ | 0.00 | 0.00 | 0.00 | 0.00 | 0.00 | 0.00 | 0.00 |
| | $Sr^{2+}$ | 0.00 | 0.00 | 0.00 | 0.00 | 0.00 | 0.00 | 0.00 |
| | $Ba^{2+}$ | 0.00 | 0.00 | 0.00 | 0.00 | 0.00 | 0.00 | 0.00 |
| | $Ge^{4+}$ | 0.00 | 0.00 | 0.00 | 0.00 | 0.00 | 0.00 | 0.00 |
| | Total | 100.00 | 100.00 | 100.00 | 100.00 | 100.00 | 100.00 | 100.00 |
| | $B^{3+} + Si^{4+}$ | 36.13 | 35.72 | 33.54 | 36.35 | 33.54 | 35.60 | 33.53 |
| | $La^{3+} + Gd^{3+} + Y^{3+} + Yb^{3+}$ | 19.76 | 20.24 | 19.01 | 20.59 | 19.01 | 20.17 | 19.01 |
| | $Gd^{3+} + Y^{3+} + Yb^{3+}$ | 1.16 | 1.19 | 1.12 | 1.21 | 1.12 | 1.19 | 1.12 |
| | $Ti^{4+} + Nb^{5+} + Ta^{5+} + W^{6+} + Bi^{3+}$ | 23.26 | 21.42 | 26.20 | 20.05 | 26.20 | 21.69 | 26.21 |
| | $Ti^{4+} + Ta^{5+}$ | 10.98 | 4.76 | 10.55 | 7.26 | 6.71 | 7.12 | 6.71 |
| | $Nb^{5+} + W^{6+}$ | 12.28 | 16.66 | 15.65 | 12.79 | 19.49 | 14.57 | 19.50 |
| | $Zn^{2+} + Mg^{2+}$ | 18.52 | 20.24 | 19.01 | 20.59 | 19.01 | 20.17 | 19.01 |
| | $Li^+ + Na^+ + K^+$ | 0.00 | 0.00 | 0.00 | 0.00 | 0.00 | 0.00 | 0.00 |
| Cation ratio | $Ti^{4+}/(Ti^{4+} + Nb^{5+} + Ta^{5+} + W^{6+} + Bi^{3+})$ | 0.27 | 0.00 | 0.23 | 0.12 | 0.09 | 0.11 | 0.09 |
| | $(Nb^{5+} + Ta^{5+})/(Ti^{4+} + Nb^{5+} + Ta^{5+} + W^{6+} + Bi^{3+})$ | 0.33 | 0.56 | 0.43 | 0.40 | 0.57 | 0.55 | 0.43 |
| | $(Ti^{4+} + Nb^{5+} + Ta^{5+} + W^{6+} + Bi^{3+})/(B^{3+} + Si^{4+})$ | 0.64 | 0.60 | 0.78 | 0.55 | 0.78 | 0.61 | 0.78 |
| | $(Ti^{4+} + Nb^{5+} + Ta^{5+} + W^{6+} + Bi^{3+})/(La^{3+} + Gd^{3+} + Y^{3+} + Yb^{3+})$ | 1.18 | 1.06 | 1.38 | 0.97 | 1.38 | 1.08 | 1.38 |
| | $(Zn^{2+} + Mg^{2+} + Li^+)/(La^{3+} + Gd^{3+} + Y^{3+} + Yb^{3+})$ | 0.94 | 1.00 | 1.00 | 1.00 | 1.00 | 1.00 | 1.00 |
| | $Si^{4+}/Bi^+$ | 0.03 | 0.07 | 0.07 | 0.07 | 0.07 | 0.07 | 0.07 |
| | $Ta^{5+}/(Ti^{4+} + Ta^{5+})$ | 0.42 | 1.00 | 0.42 | 0.67 | 0.67 | 0.67 | 0.67 |
| | $W^{6+}/(Nb^{5+} + W^{6+})$ | 0.76 | 0.57 | 0.57 | 0.76 | 0.46 | 0.51 | 0.66 |
| Anion % | $O^{2-}$ | 100.00 | 100.00 | 100.00 | 100.00 | 100.00 | 100.00 | 100.00 |
| Characteristics | nd | 1.951 | 1.937 | 1.970 | 1.931 | 1.968 | 1.946 | 1.956 |
| | υd | 29.4 | 31.0 | 28.1 | 31.2 | 28.6 | 30.4 | 28.9 |
| | (3.91 − nd)/0.06 | 32.6 | 32.9 | 32.3 | 33.0 | 32.4 | 32.7 | 32.6 |
| | $P_{g,F}$ | 0.6020 | 0.5907 | 0.6024 | 0.5920 | 0.6001 | 0.5974 | 0.5999 |
| | $\Delta Pg,f$ | 0.0065 | −0.0019 | 0.0064 | −0.0002 | 0.0033 | 0.0038 | 0.0036 |
| | Specific gravity | 5.38 | 5.46 | 5.37 | 5.47 | 5.40 | 5.39 | 5.52 |
| | Tg(° C.) | 589 | 589 | 591 | 592 | 591 | 590 | 587 |
| | Liquidus temperature (° C.) | 1110 | 1120 | 1130 | 1120 | 1080 | 1090 | 1070 |
| | λ70(nm) | 452 | 404 | 463 | 410 | 432 | 418 | 445 |
| | λ5(nm) | 368 | 360 | 370 | 361 | 366 | 362 | 367 |
| Number density of surface crystals in surface devitrification test | | 100 or less | 3000 or less | 500 or less | 100 or less | 100 or less | 100 or less | 100 or less |

| | No. | 15 Cation % | 16 Cation % | 17 Cation % | 18 Cation % | 19 Cation % | 20 Cation % | 21 Cation % |
|---|---|---|---|---|---|---|---|---|
| Cation % | $Si^{4+}$ | 2.42 | 2.37 | 2.28 | 1.08 | 2.33 | 2.42 | 3.98 |
| | $B^{3+}$ | 33.93 | 33.23 | 31.92 | 35.04 | 32.54 | 33.93 | 30.92 |
| | $Zn^{2+}$ | 16.42 | 20.17 | 19.38 | 18.52 | 19.77 | 20.59 | 20.32 |
| | $La^{3+}$ | 19.38 | 18.98 | 18.24 | 19.27 | 19.77 | 15.21 | 18.38 |
| | $Gd^{3+}$ | 0.00 | 0.00 | 0.00 | 0.00 | 0.00 | 0.00 | 8.00 |
| | $Y^{3+}$ | 1.21 | 1.19 | 1.14 | 0.00 | 0.00 | 1.21 | 0.22 |
| | $Yb^{3+}$ | 0.00 | 0.00 | 0.00 | 0.00 | 0.00 | 0.00 | 0.00 |
| | $Zr^{4+}$ | 2.42 | 2.37 | 2.28 | 2.33 | 2.33 | 2.42 | 3.36 |
| | $Ti^{4+}$ | 2.42 | 2.37 | 2.28 | 2.33 | 2.33 | 2.42 | 5.08 |
| | $Nb^{5+}$ | 7.27 | 7.12 | 6.84 | 6.98 | 6.98 | 7.27 | 1.84 |
| | $Ta^{5+}$ | 4.84 | 2.71 | 6.52 | 5.15 | 4.65 | 4.84 | 1.67 |
| | $W^{6+}$ | 9.69 | 9.49 | 9.12 | 9.30 | 9.30 | 9.69 | 6.23 |
| | $Bi^{3+}$ | 0.00 | 0.00 | 0.00 | 0.00 | 0.00 | 0.00 | 0.00 |
| | $Li^+$ | 0.00 | 0.00 | 0.00 | 0.00 | 0.00 | 0.00 | 0.00 |
| | $Na^+$ | 0.00 | 0.00 | 0.00 | 0.00 | 0.00 | 0.00 | 0.00 |
| | $K^+$ | 0.00 | 0.00 | 0.00 | 0.00 | 0.00 | 0.00 | 0.00 |
| | $Mg^{2+}$ | 0.00 | 0.00 | 0.00 | 0.00 | 0.00 | 0.00 | 0.00 |
| | $Ca^{2+}$ | 0.00 | 0.00 | 0.00 | 0.00 | 0.00 | 0.00 | 0.00 |
| | $Sr^{2+}$ | 0.00 | 0.00 | 0.00 | 0.00 | 0.00 | 0.00 | 0.00 |
| | $Ba^{2+}$ | 0.00 | 0.00 | 0.00 | 0.00 | 0.00 | 0.00 | 0.00 |
| | $Ge^{4+}$ | 0.00 | 0.00 | 0.00 | 0.00 | 0.00 | 0.00 | 0.00 |
| | Total | 100.00 | 100.00 | 100.00 | 100.00 | 100.00 | 100.00 | 100.00 |
| | $B^{3+} + Si^{4+}$ | 36.35 | 35.60 | 34.20 | 36.12 | 34.87 | 36.35 | 34.90 |
| | $La^{3+} + Gd^{3+} + Y^{3+} + Yb^{3+}$ | 20.59 | 20.17 | 19.38 | 19.27 | 19.77 | 16.42 | 26.60 |
| | $Gd^{3+} + Y^{3+} + Yb^{3+}$ | 1.21 | 1.19 | 1.14 | 0.00 | 0.00 | 1.21 | 8.22 |
| | $Ti^{4+} + Nb^{5+} + Ta^{5+} + W^{6+} + Bi^{3+}$ | 24.22 | 21.69 | 24.76 | 23.76 | 23.26 | 24.22 | 14.82 |
| | $Ti^{4+} + Ta^{5+}$ | 7.26 | 5.08 | 8.80 | 7.48 | 6.98 | 7.26 | 6.75 |
| | $Nb^{5+} + W^{6+}$ | 16.96 | 16.61 | 15.96 | 16.28 | 16.28 | 16.96 | 8.07 |
| | $Zn^{2+} + Mg^{2+}$ | 16.42 | 20.17 | 19.38 | 18.52 | 19.77 | 20.59 | 20.32 |
| | $Li^+ + Na^+ + K^+$ | 0.00 | 0.00 | 0.00 | 0.00 | 0.00 | 0.00 | 0.00 |
| Cation ratio | $Ti^{4+}/(Ti^{4+} + Nb^{5+} + Ta^{5+} + W^{6+} + Bi^{3+})$ | 0.10 | 0.11 | 0.09 | 0.10 | 0.10 | 0.10 | 0.34 |
| | $(Nb^{5+} + Ta^{5+})/(Ti^{4+} + Nb^{5+} + Ta^{5+} + W^{6+} + Bi^{3+})$ | 0.50 | 0.45 | 0.54 | 0.51 | 0.50 | 0.50 | 0.24 |

TABLE 1-continued

|  |  |  |  |  |  |  |  |  |
|---|---|---|---|---|---|---|---|---|
|  | $(Ti^{4+} + Nb^{5+} + Ta^{5+} + W^{6+} + Bi^{3+})/(B^{3+} + Si^{4+})$ | 0.67 | 0.61 | 0.72 | 0.66 | 0.67 | 0.67 | 0.42 |
|  | $(Ti^{4+} + Nb^{5+} + Ta^{5+} + W^{6+} + Bi^{3+})/(La^{3+} + Gd^{3+} + Y^{3+} + Yb^{3+})$ | 1.18 | 1.08 | 1.28 | 1.23 | 1.18 | 1.48 | 0.56 |
|  | $(Zn^{2+} + Mg^{2+} + Li^+)/(La^{3+} + Gd^{3+} + Y^{3+} + Yb^{3+})$ | 0.80 | 1.00 | 1.00 | 0.96 | 1.00 | 1.25 | 0.76 |
|  | $Si^{4+}/Bi^+$ | 0.07 | 0.07 | 0.07 | 0.03 | 0.07 | 0.07 | 0.13 |
|  | $Ta^{5+}/(Ti^{4+} + Ta^{5+})$ | 0.67 | 0.53 | 0.74 | 0.69 | 0.67 | 0.67 | 0.25 |
|  | $W^{6+}/(Nb^{5+} + W^{6+})$ | 0.57 | 0.57 | 0.57 | 0.57 | 0.57 | 0.57 | 0.77 |
| Anion % | $O^{2-}$ | 100.00 | 100.00 | 100.00 | 100.00 | 100.00 | 100.00 | 100.00 |
| Characteristics | nd | 1.951 | 1.943 | 1.957 | 1.951 | 1.952 | 1.936 | 1.937 |
|  | υ d | 29.7 | 30.2 | 29.5 | 29.7 | 29.8 | 29.2 | 32.3 |
|  | (3.91 − nd)/0.06 | 32.7 | 32.8 | 32.6 | 32.6 | 32.6 | 32.9 | 32.9 |
|  | $P_{g,F}$ | 0.5995 | 0.5988 | 0.5967 | 0.5963 | 0.5961 | 0.5989 | 0.5932 |
|  | $\Delta P_{g,f}$ | 0.0047 | 0.0048 | 0.0014 | 0.0014 | 0.0014 | 0.0031 | 0.0031 |
|  | Specific gravity | 5.42 | 5.36 | 5.51 | 5.45 | 5.46 | 5.32 | 5.54 |
|  | Tg(° C.) | 598 | 586 | 595 | 588 | 588 | 582 | 620 |
|  | Liquidus temperature (° C.) | 1070 | 1080 | 1080 | 1060 | 1090 | 1050 | 1200 |
|  | λ 70(nm) | 436 | 419 | 420 | 420 | 418 | 443 | 427 |
|  | λ 5(nm) | 365 | 363 | 363 | 364 | 363 | 366 | 360 |
| Number density of surface crystals in surface devitrification test |  | 100 or less | 100 or less | 100 or less | 100 or less | 100 or less | 100 or less | 3000 or less |

|  |  | 22 Cation % | 23 Cation % | 24 Cation % | 25 Cation % | 26 Cation % | 27 Cation % | 28 Cation % |
|---|---|---|---|---|---|---|---|---|
| Cation % | $Si^{4+}$ | 3.98 | 1.08 | 1.08 | 1.08 | 1.08 | 1.08 | 2.09 |
|  | $B^{3+}$ | 30.92 | 35.05 | 35.30 | 33.04 | 35.04 | 35.17 | 33.75 |
|  | $Zn^{2+}$ | 20.32 | 18.52 | 18.52 | 18.52 | 18.52 | 18.57 | 18.69 |
|  | $La^{3+}$ | 18.38 | 19.26 | 19.27 | 19.27 | 16.27 | 18.82 | 18.94 |
|  | $Gd^{3+}$ | 8.00 | 0.00 | 0.00 | 0.00 | 3.00 | 0.50 | 0.50 |
|  | $Y^{3+}$ | 0.22 | 0.00 | 0.00 | 0.00 | 0.00 | 0.00 | 0.00 |
|  | $Yb^{3+}$ | 0.00 | 0.00 | 0.00 | 0.00 | 0.00 | 0.00 | 0.00 |
|  | $Zr^{4+}$ | 3.36 | 2.33 | 2.33 | 2.33 | 2.33 | 2.33 | 2.35 |
|  | $Ti^{4+}$ | 3.90 | 0.33 | 0.00 | 2.33 | 2.33 | 0.00 | 2.00 |
|  | $Nb^{5+}$ | 1.41 | 8.98 | 10.05 | 8.98 | 6.98 | 10.03 | 7.85 |
|  | $Ta^{5+}$ | 1.28 | 5.15 | 5.15 | 5.15 | 5.15 | 5.17 | 5.20 |
|  | $W^{6+}$ | 8.23 | 9.30 | 8.30 | 9.30 | 9.30 | 8.33 | 8.63 |
|  | $Bi^{3+}$ | 0.00 | 0.00 | 0.00 | 0.00 | 0.00 | 0.00 | 0.00 |
|  | $Li^+$ | 0.00 | 0.00 | 0.00 | 0.00 | 0.00 | 0.00 | 0.00 |
|  | $Na^+$ | 0.00 | 0.00 | 0.00 | 0.00 | 0.00 | 0.00 | 0.00 |
|  | $K^+$ | 0.00 | 0.00 | 0.00 | 0.00 | 0.00 | 0.00 | 0.00 |
|  | $Mg^{2+}$ | 0.00 | 0.00 | 0.00 | 0.00 | 0.00 | 0.00 | 0.00 |
|  | $Ca^{2+}$ | 0.00 | 0.00 | 0.00 | 0.00 | 0.00 | 0.00 | 0.00 |
|  | $Sr^{2+}$ | 0.00 | 0.00 | 0.00 | 0.00 | 0.00 | 0.00 | 0.00 |
|  | $Ba^{2+}$ | 0.00 | 0.00 | 0.00 | 0.00 | 0.00 | 0.00 | 0.00 |
|  | $Ge^{4+}$ | 0.00 | 0.00 | 0.00 | 0.00 | 0.00 | 0.00 | 0.00 |
|  | Total | 100.00 | 100.00 | 100.00 | 100.00 | 100.00 | 100.00 | 100.00 |
|  | $B^{3+} + Si^{4+}$ | 34.90 | 36.13 | 36.38 | 34.12 | 36.12 | 36.25 | 35.84 |
|  | $La^{3+} + Gd^{3+} + Y^{3+} + Yb^{3+}$ | 26.60 | 19.26 | 19.27 | 19.27 | 19.27 | 19.32 | 19.44 |
|  | $Gd^{3+} + Y^{3+} + Yb^{3+}$ | 8.22 | 0.00 | 0.00 | 0.00 | 3.00 | 0.50 | 0.50 |
|  | $Ti^{4+} + Nb^{5+} + Ta^{5+} + W^{6+} + Bi^{3+}$ | 14.82 | 23.76 | 23.50 | 25.76 | 23.76 | 23.53 | 23.68 |
|  | $Ti^{4+} + Ta^{5+}$ | 5.18 | 5.48 | 5.15 | 7.48 | 7.48 | 5.17 | 7.20 |
|  | $Nb^{5+} + W^{6+}$ | 9.64 | 18.28 | 18.35 | 18.28 | 16.28 | 18.36 | 16.48 |
|  | $Zn^{2+} + Mg^{2+}$ | 20.32 | 18.52 | 18.52 | 18.52 | 18.52 | 18.57 | 18.69 |
|  | $Li^+ + Na^+ + K^+$ | 0.00 | 0.00 | 0.00 | 0.00 | 0.00 | 0.00 | 0.00 |
| Cation ratio | $Ti^{4+}/(Ti^{4+} + Nb^{5+} + Ta^{5+} + W^{6+} + Bi^{3+})$ | 0.26 | 0.01 | 0.00 | 0.09 | 0.10 | 0.00 | 0.08 |
|  | $(Nb^{5+} + Ta^{5+})/(Ti^{4+} + Nb^{5+} + Ta^{5+} + W^{6+} + Bi^{3+})$ | 0.18 | 0.59 | 0.65 | 0.55 | 0.51 | 0.65 | 0.55 |
|  | $(Ti^{4+} + Nb^{5+} + Ta^{5+} + W^{6+} + Bi^{3+})/(B^{3+} + Si^{4+})$ | 0.42 | 0.66 | 0.65 | 0.75 | 0.66 | 0.65 | 0.66 |
|  | $(Ti^{4+} + Nb^{5+} + Ta^{5+} + W^{6+} + Bi^{3+})/(La^{3+} + Gd^{3+} + Y^{3+} + Yb^{3+})$ | 0.56 | 1.23 | 1.22 | 1.34 | 1.23 | 1.22 | 1.22 |
|  | $(Zn^{2+} + Mg^{2+} + Li^+)/(La^{3+} + Gd^{3+} + Y^{3+} + Yb^{3+})$ | 0.76 | 0.96 | 0.96 | 0.96 | 0.96 | 0.96 | 0.96 |
|  | $Si^{4+}/Bi^+$ | 0.13 | 0.03 | 0.03 | 0.03 | 0.03 | 0.03 | 0.06 |
|  | $Ta^{5+}/(Ti^{4+} + Ta^{5+})$ | 0.25 | 0.94 | 1.00 | 0.69 | 0.69 | 1.00 | 0.72 |
|  | $W^{6+}/(Nb^{5+} + W^{6+})$ | 0.85 | 0.51 | 0.45 | 0.51 | 0.57 | 0.45 | 0.52 |
| Anion % | $O^{2-}$ | 100.00 | 100.00 | 100.00 | 100.00 | 100.00 | 100.00 | 100.00 |
| Characteristics | nd | 1.934 | 1.950 | 1.951 | 1.968 | 1.950 | 1.951 | 1.951 |
|  | υ d | 32.3 | 30.0 | 30.1 | 28.8 | 29.7 | 30.1 | 29.7 |
|  | (3.91 − nd)/0.06 | 32.9 | 32.7 | 32.7 | 32.4 | 32.7 | 32.7 | 32.7 |
|  | $P_{g,F}$ | 0.5941 | 0.5949 | 0.5945 | 0.5995 | 0.5993 | 0.5942 | 0.5959 |
|  | $\Delta P_{g,f}$ | 0.0039 | 0.0005 | 0.0003 | 0.0030 | 0.0045 | 0.0001 | 0.0011 |
|  | Specific gravity | 5.61 | 5.46 | 5.43 | 5.48 | 5.49 | 5.44 | 5.44 |
|  | Tg(° C.) | 616 | 588 | 593 | 592 | 593 | 592 | 594 |
|  | Liquidus temperature (° C.) | 1200 | 1070 | 1070 | 1080 | 1100 | 1070 | 1065 |

TABLE 1-continued

|  |  | | | | | | | |
|---|---|---|---|---|---|---|---|---|
|  | λ 70(nm) | 426 | 412 | 410 | 427 | 424 | 412 | 421 |
|  | λ 5(nm) | 361 | 362 | 361 | 366 | 364 | 361 | 364 |
| Number density of surface crystals in surface devitrification test | | 3000 or less | 100 or less | 100 or less | 100 or less | 100 or less | 100 or less | 100 or less |

| | No. | 29 Cation % | 30 Cation % | 31 Cation % | 32 Cation % | 33 Cation % | 34 Cation % | 35 Cation % |
|---|---|---|---|---|---|---|---|---|
| Cation % | $Si^{4+}$ | 2.09 | 2.09 | 2.09 | 2.09 | 2.09 | 2.09 | 2.09 |
| | $B^{3+}$ | 33.75 | 33.75 | 33.75 | 33.75 | 33.75 | 33.75 | 33.75 |
| | $Zn^{2+}$ | 16.69 | 14.69 | 16.69 | 16.69 | 14.69 | 14.69 | 10.69 |
| | $La^{3+}$ | 18.94 | 18.94 | 18.94 | 18.94 | 18.94 | 18.94 | 18.94 |
| | $Gd^{3+}$ | 0.50 | 0.50 | 0.50 | 0.50 | 0.50 | 0.50 | 0.50 |
| | $Y^{3+}$ | 0.00 | 0.00 | 0.00 | 0.00 | 0.00 | 0.90 | 0.00 |
| | $Yb^{3+}$ | 0.00 | 0.00 | 0.00 | 0.00 | 0.00 | 0.00 | 0.00 |
| | $Zr^{4+}$ | 2.35 | 2.35 | 2.35 | 2.35 | 2.35 | 2.35 | 2.35 |
| | $Ti^{4+}$ | 2.00 | 2.00 | 2.00 | 2.00 | 2.00 | 2.00 | 2.00 |
| | $Nb^{5+}$ | 7.85 | 7.85 | 7.85 | 7.85 | 7.85 | 7.85 | 7.85 |
| | $Ta^{5+}$ | 5.20 | 5.20 | 5.20 | 5.20 | 5.20 | 5.20 | 5.20 |
| | $W^{6+}$ | 8.63 | 8.63 | 8.63 | 8.63 | 8.63 | 8.63 | 8.63 |
| | $Bi^{3+}$ | 0.00 | 0.00 | 0.00 | 0.00 | 0.00 | 0.00 | 0.00 |
| | $Li^{+}$ | 2.00 | 4.00 | 0.00 | 0.00 | 0.00 | 0.00 | 0.00 |
| | $Na^{+}$ | 0.00 | 0.00 | 2.00 | 0.00 | 0.00 | 0.00 | 0.00 |
| | $K^{+}$ | 0.00 | 0.00 | 0.00 | 2.00 | 0.00 | 4.00 | 0.00 |
| | $Mg^{2+}$ | 0.00 | 0.00 | 0.00 | 0.00 | 4.00 | 0.00 | 8.00 |
| | $Ca^{2+}$ | 0.00 | 0.00 | 0.00 | 0.00 | 0.00 | 0.00 | 0.00 |
| | $Sr^{2+}$ | 0.00 | 0.00 | 0.00 | 0.00 | 0.00 | 0.00 | 0.00 |
| | $Ba^{2+}$ | 0.00 | 0.00 | 0.00 | 0.00 | 0.00 | 0.00 | 0.00 |
| | $Ge^{4+}$ | 0.00 | 0.00 | 0.00 | 0.00 | 0.00 | 0.00 | 0.00 |
| | Total | 100.00 | 100.00 | 100.00 | 100.00 | 100.00 | 100.00 | 100.00 |
| | $B^{3+} + Si^{4+}$ | 35.84 | 35.84 | 35.84 | 35.84 | 35.84 | 35.84 | 35.84 |
| | $La^{3+} + Gd^{3+} + Y^{3+} + Yb^{3+}$ | 19.44 | 19.44 | 19.44 | 19.44 | 19.44 | 19.44 | 19.44 |
| | $Gd^{3+} + Y^{3+} + Yb^{3+}$ | 0.50 | 0.50 | 0.50 | 0.50 | 0.50 | 0.50 | 0.50 |
| | $Ti^{4+} + Nb^{5+} + Ta^{5+} + W^{6+} + Bi^{3+}$ | 23.68 | 23.68 | 23.68 | 23.68 | 23.68 | 23.68 | 23.68 |
| | $Ti^{4+} + Ta^{5+}$ | 7.20 | 7.20 | 7.20 | 7.20 | 7.20 | 7.20 | 7.20 |
| | $Nb^{5+} + W^{6+}$ | 16.48 | 16.48 | 16.48 | 16.48 | 16.48 | 16.48 | 16.48 |
| | $Zn^{2+} + Mg^{2+}$ | 16.69 | 14.69 | 16.69 | 16.69 | 18.69 | 14.69 | 18.69 |
| | $Li^{+} + Na^{+} + K^{+}$ | 2.00 | 4.00 | 2.00 | 2.00 | 0.00 | 4.00 | 0.00 |
| Cation ratio | $Ti^{4+}/(Ti^{4+} + Nb^{5+} + Ta^{5+} + W^{6+} + Bi^{3+})$ | 0.08 | 0.08 | 0.08 | 0.08 | 0.08 | 0.08 | 0.08 |
| | $(Nb^{5+} + Ta^{5+})/(Ti^{4+} + Nb^{5+} + Ta^{5+} + W^{6+} + Bi^{3+})$ | 0.55 | 0.55 | 0.55 | 0.55 | 0.55 | 0.55 | 0.55 |
| | $(Ti^{4+} + Nb^{5+} + Ta^{5+} + W^{6+} + Bi^{3+})/(B^{3+} + Si^{4+})$ | 0.66 | 0.66 | 0.66 | 0.66 | 0.66 | 0.66 | 0.66 |
| | $(Ti^{4+} + Nb^{5+} + Ta^{5+} + W^{6+} + Bi^{3+})/(La^{3+} + Gd^{3+} + Y^{3+} + Yb^{3+})$ | 1.22 | 1.22 | 1.22 | 1.22 | 1.22 | 1.22 | 1.22 |
| | $(Zn^{2+} + Mg^{2+} + Li^{+})/(La^{3+} + Gd^{3+} + Y^{3+} + Yb^{3+})$ | 0.96 | 0.96 | 0.86 | 0.86 | 0.96 | 0.76 | 0.96 |
| | $Si^{4+}/Bi^{+}$ | 0.06 | 0.06 | 0.06 | 0.06 | 0.06 | 0.06 | 0.06 |
| | $Ta^{5+}/(Ti^{4+} + Ta^{5+})$ | 0.72 | 0.72 | 0.72 | 0.72 | 0.72 | 0.72 | 0.72 |
| | $W^{6+}/(Nb^{5+} + W^{6+})$ | 0.52 | 0.52 | 0.52 | 0.52 | 0.52 | 0.52 | 0.52 |
| Anion % | $O^{2-}$ | 100.00 | 100.00 | 100.00 | 100.00 | 100.00 | 100.00 | 100.00 |
| Characteristics | nd | 1.950 | 1.949 | 1.944 | 1.939 | 1.943 | 1.926 | 1.936 |
| | υ d | 29.8 | 29.9 | 29.8 | 30.0 | 30.1 | 30.1 | 30.4 |
| | (3.91 − nd)/0.06 | 32.7 | 32.7 | 32.8 | 32.9 | 32.8 | 33.1 | 32.9 |
| | $P_{g,F}$ | 0.5967 | 0.5970 | 0.5973 | 0.5982 | 0.5968 | 0.5967 | 0.5973 |
| | $\Delta P_{g,f}$ | 0.0020 | 0.0025 | 0.0026 | 0.0039 | 0.0027 | 0.0026 | 0.0037 |
| | Specific gravity | 5.41 | 5.38 | 5.39 | 5.36 | 5.37 | 5.27 | 5.30 |
| | Tg(° C.) | 579 | 569 | 587 | 592 | 601 | 589 | 611 |
| | Liquidus temperature (° C.) | 1070 | 1070 | 1070 | 1080 | 1095 | 1120 | 1130 |
| | λ 70(nm) | 524 | 419 | 423 | 417 | 426 | 412 | 440 |
| | λ 5(nm) | 362 | 362 | 362 | 362 | 364 | 360 | 365 |
| Number density of surface crystals in surface devitrification test | | 100 or less | 3000 or less | 3000 or less | 1000 or less | 100 or less | 100 or less | 100 or less |

| | No. | 36 Cation % | 37 Cation % | 38 Cation % | 39 Cation % | 40 Cation % | 41 Cation % | 42 Cation % |
|---|---|---|---|---|---|---|---|---|
| Cation % | $Si^{4+}$ | 2.09 | 2.09 | 0.00 | 2.09 | 2.09 | 2.09 | 2.09 |
| | $B^{3+}$ | 33.75 | 33.75 | 33.75 | 31.75 | 33.75 | 33.75 | 33.75 |
| | $Zn^{2+}$ | 16.69 | 16.69 | 18.69 | 18.69 | 18.69 | 6.69 | 0.00 |
| | $La^{3+}$ | 18.94 | 18.94 | 18.94 | 18.94 | 17.94 | 18.94 | 18.94 |
| | $Gd^{3+}$ | 0.50 | 0.50 | 0.50 | 0.50 | 0.50 | 0.50 | 0.50 |
| | $Y^{3+}$ | 0.00 | 0.00 | 0.00 | 0.00 | 0.00 | 0.00 | 0.00 |
| | $Yb^{3+}$ | 0.00 | 0.00 | 0.00 | 0.00 | 1.00 | 0.00 | 0.00 |
| | $Zr^{4+}$ | 2.35 | 2.35 | 2.35 | 2.35 | 2.35 | 2.35 | 2.35 |
| | $Ti^{4+}$ | 2.00 | 2.00 | 2.00 | 2.00 | 2.00 | 2.00 | 2.00 |
| | $Nb^{5+}$ | 7.85 | 7.85 | 7.85 | 7.85 | 7.85 | 7.85 | 7.85 |
| | $Ta^{5+}$ | 5.20 | 5.20 | 5.20 | 5.20 | 5.20 | 5.20 | 5.20 |

TABLE 1-continued

| | | | | | | | | |
|---|---|---|---|---|---|---|---|---|
| | $W^{6+}$ | 8.63 | 8.63 | 8.63 | 8.63 | 8.63 | 8.63 | 8.63 |
| | $Bi^{3+}$ | 0.00 | 0.00 | 0.00 | 0.00 | 0.00 | 0.00 | 0.00 |
| | $Li^+$ | 0.00 | 0.00 | 0.00 | 0.00 | 0.00 | 0.00 | 0.00 |
| | $Na^+$ | 0.00 | 0.00 | 0.00 | 0.00 | 0.00 | 0.00 | 0.00 |
| | $K^+$ | 0.00 | 0.00 | 0.00 | 0.00 | 0.00 | 0.00 | 0.00 |
| | $Mg^{2+}$ | 0.00 | 0.00 | 0.00 | 0.00 | 0.00 | 12.00 | 18.69 |
| | $Ca^{2+}$ | 0.00 | 0.00 | 0.00 | 0.00 | 0.00 | 0.00 | 0.00 |
| | $Sr^{2+}$ | 2.00 | 0.00 | 0.00 | 0.00 | 0.00 | 0.00 | 0.00 |
| | $Ba^{2+}$ | 0.00 | 2.00 | 0.00 | 0.00 | 0.00 | 0.00 | 0.00 |
| | $Ge^{4+}$ | 0.00 | 0.00 | 2.09 | 2.00 | 0.00 | 0.00 | 0.00 |
| | Total | 100.00 | 100.00 | 100.00 | 100.00 | 100.00 | 100.00 | 100.00 |
| | $B^{3+} + Si^{4+}$ | 35.84 | 35.84 | 33.75 | 33.84 | 35.84 | 35.84 | 35.84 |
| | $La^{3+} + Gd^{3+} + Y^{3+} + Yb^{3+}$ | 19.44 | 19.44 | 19.44 | 19.44 | 19.44 | 19.44 | 19.44 |
| | $Gd^{3+} + Y^{3+} + Yb^{3+}$ | 0.50 | 0.50 | 0.50 | 0.50 | 1.50 | 0.50 | 0.50 |
| | $Ti^{4+} + Nb^{5+} + Ta^{5+} + W^{6+} + Bi^{3+}$ | 23.68 | 23.68 | 23.68 | 23.68 | 23.68 | 23.68 | 23.68 |
| | $Ti^{4+} + Ta^{5+}$ | 7.20 | 7.20 | 7.20 | 7.20 | 7.20 | 7.20 | 7.20 |
| | $Nb^{5+} + W^{6+}$ | 16.48 | 16.48 | 16.48 | 16.48 | 16.48 | 16.48 | 16.48 |
| | $Zn^{2+} + Mg^{2+}$ | 16.69 | 16.69 | 18.69 | 18.69 | 18.69 | 18.69 | 18.69 |
| | $Li^+ + Na^+ + K^+$ | 0.00 | 0.00 | 0.00 | 0.00 | 0.00 | 0.00 | 0.00 |
| Cation ratio | $Ti^{4+}/(Ti^{4+} + Nb^{5+} + Ta^{5+} + W^{6+} + Bi^{3+})$ | 0.08 | 0.08 | 0.08 | 0.08 | 0.08 | 0.08 | 0.08 |
| | $(Nb^{5+} + Ta^{5+})/(Ti^{4+} + Nb^{5+} + Ta^{5+} + W^{6+} + Bi^{3+})$ | 0.55 | 0.55 | 0.55 | 0.55 | 0.55 | 0.55 | 0.55 |
| | $(Ti^{4+} + Nb^{5+} + Ta^{5+} + W^{6+} + Bi^{3+})/(B^{3+} + Si^{4+})$ | 0.66 | 0.66 | 0.70 | 0.70 | 0.66 | 0.66 | 0.66 |
| | $(Ti^{4+} + Nb^{5+} + Ta^{5+} + W^{6+} + Bi^{3+})/(La^{3+} + Gd^{3+} + Y^{3+} + Yb^{3+})$ | 1.22 | 1.22 | 1.22 | 1.22 | 1.22 | 1.22 | 1.22 |
| | $(Zn^{2+} + Mg^{2+} + Li^+)/(La^{3+} + Gd^{3+} + Y^{3+} + Yb^{3+})$ | 0.86 | 0.86 | 0.96 | 0.96 | 0.96 | 0.96 | 0.96 |
| | $Si^{4+}/Bi^+$ | 0.06 | 0.06 | 0.00 | 0.07 | 0.06 | 0.06 | 0.06 |
| | $Ta^{5+}/(Ti^{4+} + Ta^{5+})$ | 0.72 | 0.72 | 0.72 | 0.72 | 0.72 | 0.72 | 0.72 |
| | $W^{6+}/(Nb^{5+} + W^{6+})$ | 0.52 | 0.52 | 0.52 | 0.52 | 0.52 | 0.52 | 0.52 |
| Anion % | $O^{2-}$ | 100.00 | 100.00 | 100.00 | 100.00 | 100.00 | 100.00 | 100.00 |
| Characteristics | nd | 1.949 | 1.948 | 1.957 | 1.952 | 1.950 | 1.927 | 1.914 |
| | υd | 30.0 | 30.0 | 29.6 | 29.7 | 29.7 | 30.7 | 31.4 |
| | (3.91 − nd)/0.06 | 32.7 | 32.7 | 32.6 | 32.6 | 32.7 | 33.1 | 33.3 |
| | $P_{g,F}$ | 0.5972 | 0.5968 | 0.5998 | 0.5969 | 0.5959 | 0.5938 | 0.5942 |
| | $\Delta P_{g,f}$ | 0.0029 | 0.0025 | 0.0048 | 0.0021 | 0.0011 | 0.0008 | 0.0024 |
| | Specific gravity | 5.44 | 5.46 | 5.48 | 5.46 | 5.46 | 5.22 | 5.10 |
| | Tg(° C.) | 597 | 598 | 592 | 597 | 595 | 620 | 640 |
| | Liquidus temperature (° C.) | 1100 | 1090 | 1090 | 1090 | 1100 | 1150 | 1190 |
| | λ70(nm) | 423 | 416 | 428 | 426 | 421 | 455 | 464 |
| | λ5(nm) | 362 | 361 | 363 | 363 | 363 | 366 | 369 |
| Number density of surface crystals in surface devitrification test | | 3000 or less | 100 or less | 1000 or less | 1000 or less | 1000 or less | 500 or less | 500 or less |

| | No. | 43 Cation % |
|---|---|---|
| Cation % | $Si^{4+}$ | 2.05 |
| | $B^{3+}$ | 33.09 |
| | $Zn^{2+}$ | 18.32 |
| | $La^{3+}$ | 18.57 |
| | $Gd^{3+}$ | 0.49 |
| | $Y^{3+}$ | 0.00 |
| | $Yb^{3+}$ | 0.00 |
| | $Zr^{4+}$ | 4.26 |
| | $Ti^{4+}$ | 1.96 |
| | $Nb^{5+}$ | 7.69 |
| | $Ta^{5+}$ | 5.10 |
| | $W^{6+}$ | 8.47 |
| | $Bi^{3+}$ | 0.00 |
| | $Li^+$ | 0.00 |
| | $Na^+$ | 0.00 |
| | $K^+$ | 0.00 |
| | $Mg^{2+}$ | 0.00 |
| | $Ca^{2+}$ | 0.00 |
| | $Sr^{2+}$ | 0.00 |
| | $Ba^{2+}$ | 0.00 |
| | $Ge^{4+}$ | 0.00 |
| | Total | 100.00 |
| | $B^{3+} + Si^{4+}$ | 35.14 |
| | $La^{3+} + Gd^{3+} + Y^{3+} + Yb^{3+}$ | 19.06 |
| | $Gd^{3+} + Y^{3+} + Yb^{3+}$ | 0.49 |
| | $Ti^{4+} + Nb^{5+} + Ta^{5+} + W^{6+} + Bi^{3+}$ | 23.22 |
| | $Ti^{4+} + Ta^{5+}$ | 7.06 |

TABLE 1-continued

| | | |
|---|---|---|
| | $Nb^{5+} + W^{6+}$ | 16.16 |
| | $Zn^{2+} + Mg^{2+}$ | 18.32 |
| | $Li^+ + Na^+ + K^+$ | 0.00 |
| Cation ratio | $Ti^{4+}/(Ti^{4+} + Nb^{5+} + Ta^{5+} + W^{6+} + Bi^{3+})$ | 0.08 |
| | $(Nb^{5+} + Ta^{5+})/(Ti^{4+} + Nb^{5+} + Ta^{5+} + W^{6+} + Bi^{3+})$ | 0.55 |
| | $(Ti^{4+} + Nb^{5+} + Ta^{5+} + W^{6+} + Bi^{3+})/(B^{3+} + Si^{4+})$ | 0.66 |
| | $(Ti^{4+} + Nb^{5+} + Ta^{5+} + W^{6+} + Bi^{3+})/(La^{3+} + Gd^{3+} + Y^{3+} + Yb^{3+})$ | 1.22 |
| | $(Zn^{2+} + Mg^{2+} + Li^+)/(La^{3+} + Gd^{3+} + Y^{3+} + Yb^{3+})$ | 0.96 |
| | $Si^{4+}/Bi^+$ | 0.06 |
| | $Ta^{5+}/(Ti^{4+} + Ta^{5+})$ | 0.72 |
| | $W^{6+}/(Nb^{5+} + W^{6+})$ | 0.52 |
| Anion % | $O^{2-}$ | 100.00 |
| Characteristics | nd | 1.958 |
| | υ d | 29.7 |
| | (3.91 − nd)/0.06 | 32.5 |
| | $P_{g,F}$ | 0.5978 |
| | $\Delta P_{g,f}$ | 0.0030 |
| | Specific gravity | 5.45 |
| | Tg(° C.) | 598 |
| | Liquidus temperature (° C.) | 1180 |
| | λ 70(nm) | 421 |
| | λ 5(nm) | 362 |
| Number density of surface crystals in surface devitrification test | | 500 or less |

TABLE 2

| | No. | 1 Mol % | 2 Mol % | 3 Mol % | 4 Mol % | 5 Mol % | 6 Mol % | 7 Mol % | 8 Mol % | 9 Mol % |
|---|---|---|---|---|---|---|---|---|---|---|
| Mol % | $SiO_2$ | 5.48 | 2.80 | 2.78 | 0.45 | 0.46 | 3.15 | 1.46 | 1.44 | 3.25 |
| | $B_2O_3$ | 23.29 | 25.17 | 23.66 | 23.65 | 25.37 | 21.98 | 23.75 | 23.44 | 22.75 |
| | ZnO | 30.14 | 32.17 | 32.00 | 27.07 | 24.67 | 26.71 | 25.10 | 24.77 | 27.63 |
| | $La_2O_3$ | 12.33 | 11.89 | 11.83 | 12.73 | 12.91 | 12.56 | 12.61 | 12.44 | 13.00 |
| | $Gd_2O_3$ | 8.22 | 8.39 | 8.18 | 8.22 | 8.33 | 8.10 | 8.13 | 8.02 | 8.19 |
| | $Y_2O_3$ | 0.00 | 0.00 | 0.00 | 0.79 | 0.81 | 0.78 | 0.79 | 0.78 | 0.81 |
| | $Yb_2O_3$ | 0.00 | 0.00 | 0.00 | 0.00 | 0.00 | 0.00 | 0.00 | 0.00 | 0.00 |
| | $ZrO_2$ | 0.00 | 0.00 | 2.78 | 3.19 | 3.23 | 3.15 | 3.16 | 3.12 | 3.25 |
| | $TiO_2$ | 8.22 | 5.59 | 2.78 | 3.19 | 3.23 | 3.15 | 5.87 | 8.46 | 0.00 |
| | $Nb_2O_5$ | 0.00 | 0.00 | 2.09 | 4.78 | 4.85 | 4.71 | 3.37 | 1.99 | 4.87 |
| | $Ta_2O_5$ | 1.37 | 2.80 | 2.78 | 3.18 | 3.23 | 3.14 | 3.15 | 3.11 | 3.25 |
| | $WO_3$ | 10.96 | 11.19 | 11.13 | 12.73 | 12.91 | 12.56 | 12.61 | 12.44 | 12.99 |
| | $Bi_2O_3$ | 0.00 | 0.00 | 0.00 | 0.00 | 0.00 | 0.00 | 0.00 | 0.00 | 0.00 |
| | $Li_2O$ | 0.00 | 0.00 | 0.00 | 0.00 | 0.00 | 0.00 | 0.00 | 0.00 | 0.00 |
| | $Na_2O$ | 0.00 | 0.00 | 0.00 | 0.00 | 0.00 | 0.00 | 0.00 | 0.00 | 0.00 |
| | $K_2O$ | 0.00 | 0.00 | 0.00 | 0.00 | 0.00 | 0.00 | 0.00 | 0.00 | 0.00 |
| | MgO | 0.00 | 0.00 | 0.00 | 0.00 | 0.00 | 0.00 | 0.00 | 0.00 | 0.00 |
| | CaO | 0.00 | 0.00 | 0.00 | 0.00 | 0.00 | 0.00 | 0.00 | 0.00 | 0.00 |
| | SrO | 0.00 | 0.00 | 0.00 | 0.00 | 0.00 | 0.00 | 0.00 | 0.00 | 0.00 |
| | BaO | 0.00 | 0.00 | 0.00 | 0.00 | 0.00 | 0.00 | 0.00 | 0.00 | 0.00 |
| | $GeO_2$ | 0.00 | 0.00 | 0.00 | 0.00 | 0.00 | 0.00 | 0.00 | 0.00 | 0.00 |
| | Total | 100.00 | 100.00 | 100.00 | 100.00 | 100.00 | 100.00 | 100.00 | 100.00 | 100.00 |

| | No. | 10 Mol % | 11 Mol % | 12 Mol % | 13 Mol % | 14 Mol % | 15 Mol % | 16 Mol % | 17 Mol % | 18 Mol % |
|---|---|---|---|---|---|---|---|---|---|---|
| Mol % | $SiO_2$ | 2.98 | 3.24 | 3.05 | 3.23 | 2.98 | 3.33 | 3.19 | 3.09 | 1.48 |
| | $B_2O_3$ | 20.80 | 22.69 | 21.34 | 22.65 | 20.79 | 23.24 | 22.34 | 21.66 | 24.07 |
| | ZnO | 25.26 | 27.54 | 25.92 | 27.49 | 25.26 | 22.59 | 27.12 | 26.31 | 25.45 |
| | $La_2O_3$ | 11.89 | 12.96 | 12.20 | 12.94 | 11.89 | 13.33 | 12.76 | 12.38 | 13.24 |
| | $Gd_2O_3$ | 7.97 | 8.02 | 8.18 | 8.18 | 7.97 | 8.25 | 8.07 | 8.14 | 8.24 |
| | $Y_2O_3$ | 0.74 | 0.81 | 0.76 | 0.81 | 0.74 | 0.83 | 0.80 | 0.77 | 0.00 |
| | $Yb_2O_3$ | 0.00 | 0.00 | 0.00 | 0.00 | 0.00 | 0.00 | 0.00 | 0.00 | 0.00 |
| | $ZrO_2$ | 2.98 | 3.24 | 3.05 | 3.23 | 2.98 | 3.33 | 3.19 | 3.09 | 3.20 |
| | $TiO_2$ | 8.08 | 3.24 | 3.05 | 3.23 | 2.98 | 3.33 | 3.19 | 3.09 | 3.20 |
| | $Nb_2O_5$ | 4.46 | 2.07 | 7.19 | 4.85 | 4.46 | 5.00 | 4.79 | 4.64 | 4.80 |
| | $Ta_2O_5$ | 2.97 | 3.24 | 3.05 | 3.24 | 2.97 | 3.33 | 1.82 | 4.43 | 3.54 |
| | $WO_3$ | 11.88 | 12.96 | 12.19 | 10.15 | 16.99 | 13.33 | 12.76 | 12.38 | 12.78 |
| | $Bi_2O_3$ | 0.00 | 0.00 | 0.00 | 0.00 | 0.00 | 0.00 | 0.00 | 0.00 | 0.00 |
| | $Li_2O$ | 0.00 | 0.00 | 0.00 | 0.00 | 0.00 | 0.00 | 0.00 | 0.00 | 0.00 |
| | $Na_2O$ | 0.00 | 0.00 | 0.00 | 0.00 | 0.00 | 0.00 | 0.00 | 0.00 | 0.00 |

TABLE 2-continued

|  |  |  |  |  |  |  |  |  |  |
|---|---|---|---|---|---|---|---|---|---|
|  | $K_2O$ | 0.00 | 0.00 | 0.00 | 0.00 | 0.00 | 0.00 | 0.00 | 0.00 | 0.00 |
|  | MgO | 0.00 | 0.00 | 0.00 | 0.00 | 0.00 | 0.00 | 0.00 | 0.00 | 0.00 |
|  | CaO | 0.00 | 0.00 | 0.00 | 0.00 | 0.00 | 0.00 | 0.00 | 0.00 | 0.00 |
|  | SrO | 0.00 | 0.00 | 0.00 | 0.00 | 0.00 | 0.00 | 0.00 | 0.00 | 0.00 |
|  | BaO | 0.00 | 0.00 | 0.00 | 0.00 | 0.00 | 0.00 | 0.00 | 0.00 | 0.00 |
|  | $GeO_2$ | 0.00 | 0.00 | 0.00 | 0.00 | 0.00 | 0.00 | 0.00 | 0.00 | 0.00 |
|  | Total | 100.00 | 100.00 | 100.00 | 100.00 | 100.00 | 100.00 | 100.00 | 100.00 | 100.00 |

| No. | | 19 Mol % | 20 Mol % | 21 Mol % | 22 Mol % | 23 Mol % | 24 Mol % | 25 Mol % | 26 Mol % | 27 Mol % |
|---|---|---|---|---|---|---|---|---|---|---|
| Mol % | $SiO_2$ | 3.15 | 3.24 | 5.57 | 5.54 | 1.50 | 1.52 | 1.48 | 1.52 | 1.52 |
|  | $B_2O_3$ | 21.98 | 22.69 | 21.63 | 21.50 | 24.41 | 24.82 | 22.70 | 24.58 | 24.80 |
|  | ZnO | 26.71 | 27.54 | 28.43 | 28.26 | 25.80 | 26.04 | 25.45 | 25.98 | 26.19 |
|  | $La_2O_3$ | 13.35 | 10.17 | 12.86 | 12.78 | 13.42 | 13.55 | 13.24 | 11.41 | 13.27 |
|  | $Gd_2O_3$ | 8.10 | 8.02 | 8.39 | 8.35 | 8.36 | 8.44 | 8.24 | 8.42 | 8.46 |
|  | $Y_2O_3$ | 0.00 | 0.81 | 0.15 | 0.15 | 0.00 | 0.00 | 0.00 | 0.00 | 0.00 |
|  | $Yb_2O_3$ | 0.00 | 0.00 | 0.00 | 0.00 | 0.00 | 0.00 | 0.00 | 0.00 | 0.00 |
|  | $ZrO_2$ | 3.15 | 3.24 | 4.70 | 4.67 | 3.25 | 3.28 | 3.20 | 3.27 | 3.29 |
|  | $TiO_2$ | 3.15 | 3.24 | 7.11 | 5.42 | 0.46 | 0.00 | 3.20 | 3.27 | 0.00 |
|  | $Nb_2O_5$ | 4.71 | 4.86 | 1.29 | 0.98 | 6.26 | 7.07 | 6.17 | 4.90 | 7.07 |
|  | $Ta_2O_5$ | 3.14 | 3.24 | 1.17 | 0.89 | 3.59 | 3.62 | 3.54 | 3.61 | 3.65 |
|  | $WO_3$ | 12.56 | 12.96 | 8.72 | 11.45 | 12.96 | 11.67 | 12.78 | 13.05 | 11.75 |
|  | $Bi_2O_3$ | 0.00 | 0.00 | 0.00 | 0.00 | 0.00 | 0.00 | 0.00 | 0.00 | 0.00 |
|  | $Li_2O$ | 0.00 | 0.00 | 0.00 | 0.00 | 0.00 | 0.00 | 0.00 | 0.00 | 0.00 |
|  | $Na_2O$ | 0.00 | 0.00 | 0.00 | 0.00 | 0.00 | 0.00 | 0.00 | 0.00 | 0.00 |
|  | $K_2O$ | 0.00 | 0.00 | 0.00 | 0.00 | 0.00 | 0.00 | 0.00 | 0.00 | 0.00 |
|  | MgO | 0.00 | 0.00 | 0.00 | 0.00 | 0.00 | 0.00 | 0.00 | 0.00 | 0.00 |
|  | CaO | 0.00 | 0.00 | 0.00 | 0.00 | 0.00 | 0.00 | 0.00 | 0.00 | 0.00 |
|  | SrO | 0.00 | 0.00 | 0.00 | 0.00 | 0.00 | 0.00 | 0.00 | 0.00 | 0.00 |
|  | BaO | 0.00 | 0.00 | 0.00 | 0.00 | 0.00 | 0.00 | 0.00 | 0.00 | 0.00 |
|  | $GeO_2$ | 0.00 | 0.00 | 0.00 | 0.00 | 0.00 | 0.00 | 0.00 | 0.00 | 0.00 |
|  | Total | 100.00 | 100.00 | 100.00 | 100.00 | 100.00 | 100.00 | 100.00 | 100.00 | 100.00 |

| No. | | 28 Mol % | 29 Mol % | 30 Mol % | 31 Mol % | 32 Mol % | 33 Mol % | 34 Mol % | 35 Mol % | 36 Mol % |
|---|---|---|---|---|---|---|---|---|---|---|
| Mol % | $SiO_2$ | 2.88 | 2.92 | 2.96 | 2.92 | 2.92 | 2.88 | 2.96 | 2.88 | 2.88 |
|  | $B_2O_3$ | 23.23 | 23.56 | 23.89 | 23.56 | 23.56 | 23.23 | 23.89 | 23.23 | 23.23 |
|  | ZnO | 25.73 | 23.30 | 20.80 | 23.30 | 23.30 | 20.23 | 20.80 | 14.72 | 22.98 |
|  | $La_2O_3$ | 13.04 | 13.22 | 13.41 | 13.22 | 13.22 | 13.04 | 13.41 | 13.04 | 13.04 |
|  | $Gd_2O_3$ | 8.26 | 8.38 | 8.49 | 8.38 | 8.38 | 8.26 | 8.49 | 8.26 | 8.26 |
|  | $Y_2O_3$ | 0.00 | 0.00 | 0.00 | 0.00 | 0.00 | 0.00 | 0.00 | 0.00 | 0.00 |
|  | $Yb_2O_3$ | 0.00 | 0.00 | 0.00 | 0.00 | 0.00 | 0.00 | 0.00 | 0.00 | 0.00 |
|  | $ZrO_2$ | 3.24 | 3.28 | 3.33 | 3.28 | 3.28 | 3.24 | 3.33 | 3.24 | 3.24 |
|  | $TiO_2$ | 2.75 | 2.79 | 2.83 | 2.79 | 2.79 | 2.75 | 2.83 | 2.75 | 2.75 |
|  | $Nb_2O_5$ | 5.40 | 5.48 | 5.56 | 5.48 | 5.48 | 5.40 | 5.56 | 5.40 | 5.40 |
|  | $Ta_2O_5$ | 3.58 | 3.63 | 3.68 | 3.63 | 3.63 | 3.58 | 3.68 | 3.58 | 3.58 |
|  | $WO_3$ | 11.88 | 12.05 | 12.22 | 12.05 | 12.05 | 11.88 | 12.22 | 11.88 | 11.88 |
|  | $Bi_2O_3$ | 0.00 | 0.00 | 0.00 | 0.00 | 0.00 | 0.00 | 0.00 | 0.00 | 0.00 |
|  | $Li_2O$ | 0.00 | 1.40 | 2.83 | 0.00 | 0.00 | 0.00 | 0.00 | 0.00 | 0.00 |
|  | $Na_2O$ | 0.00 | 0.00 | 0.00 | 1.40 | 0.00 | 0.00 | 0.00 | 0.00 | 0.00 |
|  | $K_2O$ | 0.00 | 0.00 | 0.00 | 0.00 | 1.40 | 0.00 | 2.83 | 0.00 | 0.00 |
|  | MgO | 0.00 | 0.00 | 0.00 | 0.00 | 0.00 | 5.51 | 0.00 | 11.01 | 0.00 |
|  | CaO | 0.00 | 0.00 | 0.00 | 0.00 | 0.00 | 0.00 | 0.00 | 0.00 | 0.00 |
|  | SrO | 0.00 | 0.00 | 0.00 | 0.00 | 0.00 | 0.00 | 0.00 | 0.00 | 2.75 |
|  | BaO | 0.00 | 0.00 | 0.00 | 0.00 | 0.00 | 0.00 | 0.00 | 0.00 | 0.00 |
|  | $GeO_2$ | 0.00 | 0.00 | 0.00 | 0.00 | 0.00 | 0.00 | 0.00 | 0.00 | 0.00 |
|  | Total | 100.00 | 100.00 | 100.00 | 100.00 | 100.00 | 100.00 | 100.00 | 100.00 | 100.00 |

| No. | | 37 Mol % | 38 Mol % | 39 Mol % | 40 Mol % | 41 Mol % | 42 Mol % | 43 Mol % |
|---|---|---|---|---|---|---|---|---|
| Mol % | $SiO_2$ | 2.88 | 0.00 | 2.84 | 2.88 | 2.88 | 2.88 | 2.80 |
|  | $B_2O_3$ | 23.23 | 23.23 | 21.56 | 23.23 | 23.23 | 23.23 | 22.58 |
|  | ZnO | 22.98 | 25.73 | 25.38 | 25.73 | 9.21 | 0.00 | 25.00 |
|  | $La_2O_3$ | 13.04 | 13.04 | 12.86 | 12.35 | 13.04 | 13.04 | 12.67 |
|  | $Gd_2O_3$ | 8.26 | 8.26 | 8.15 | 8.26 | 8.26 | 8.26 | 8.19 |
|  | $Y_2O_3$ | 0.00 | 0.00 | 0.00 | 0.00 | 0.00 | 0.00 | 0.00 |
|  | $Yb_2O_3$ | 0.00 | 0.00 | 0.00 | 0.69 | 0.00 | 0.00 | 0.00 |
|  | $ZrO_2$ | 3.24 | 3.24 | 3.19 | 3.24 | 3.24 | 3.24 | 5.81 |
|  | $TiO_2$ | 2.75 | 2.75 | 2.72 | 2.75 | 2.75 | 2.75 | 2.67 |
|  | $Nb_2O_5$ | 5.40 | 5.40 | 5.33 | 5.40 | 5.40 | 5.40 | 5.25 |
|  | $Ta_2O_5$ | 3.58 | 3.58 | 3.53 | 3.58 | 3.58 | 3.58 | 3.48 |
|  | $WO_3$ | 11.88 | 11.88 | 11.72 | 11.88 | 11.88 | 11.88 | 11.56 |
|  | $Bi_2O_3$ | 0.00 | 0.00 | 0.00 | 0.00 | 0.00 | 0.00 | 0.00 |
|  | $Li_2O$ | 0.00 | 0.00 | 0.00 | 0.00 | 0.00 | 0.00 | 0.00 |

TABLE 2-continued

|  | Na$_2$O | 0.00 | 0.00 | 0.00 | 0.00 | 0.00 | 0.00 | 0.00 |
|---|---|---|---|---|---|---|---|---|
|  | K$_2$O | 0.00 | 0.00 | 0.00 | 0.00 | 0.00 | 0.00 | 0.00 |
|  | MgO | 0.00 | 0.00 | 0.00 | 0.00 | 16.52 | 25.73 | 0.00 |
|  | CaO | 0.00 | 0.00 | 0.00 | 0.00 | 0.00 | 0.00 | 0.00 |
|  | SrO | 0.00 | 0.00 | 0.00 | 0.00 | 0.00 | 0.00 | 0.00 |
|  | BaO | 2.75 | 0.00 | 0.00 | 0.00 | 0.00 | 0.00 | 0.00 |
|  | GeO$_2$ | 0.00 | 2.88 | 2.72 | 0.00 | 0.00 | 0.00 | 0.00 |
|  | Total | 100.00 | 100.00 | 100.00 | 100.00 | 100.00 | 100.00 | 100.00 |

|  | No | 1 Mass % | 2 Mass % | 3 Mass % | 4 Mass % | 5 Mass % | 6 Mass % | 7 Mass % | 8 Mass % | 9 Mass % |
|---|---|---|---|---|---|---|---|---|---|---|
| Mass % | SiO$_2$ | 2.17 | 1.07 | 1.03 | 0.16 | 0.16 | 1.09 | 0.51 | 0.52 | 1.11 |
|  | B$_2$O$_3$ | 10.66 | 11.14 | 10.18 | 9.43 | 10.05 | 8.85 | 9.68 | 9.76 | 9.02 |
|  | ZnO | 16.14 | 16.65 | 16.11 | 12.62 | 11.43 | 12.57 | 11.96 | 12.06 | 12.81 |
|  | La$_2$O$_3$ | 26.44 | 24.64 | 23.85 | 23.77 | 23.95 | 23.68 | 24.05 | 24.25 | 24.14 |
|  | Gd$_2$O$_3$ | 19.57 | 19.31 | 18.32 | 17.03 | 17.16 | 16.96 | 17.23 | 17.37 | 16.88 |
|  | Y$_2$O$_3$ | 0.00 | 0.00 | 0.00 | 1.03 | 1.03 | 1.02 | 1.04 | 1.05 | 1.04 |
|  | Yb$_2$O$_3$ | 0.00 | 0.00 | 0.00 | 0.00 | 0.00 | 0.00 | 0.00 | 0.00 | 0.00 |
|  | ZrO$_2$ | 0.00 | 0.00 | 2.12 | 2.25 | 2.27 | 2.24 | 2.28 | 2.30 | 2.28 |
|  | TiO$_2$ | 4.32 | 2.84 | 1.37 | 1.46 | 1.47 | 1.45 | 2.74 | 4.05 | 0.00 |
|  | Nb$_2$O$_5$ | 0.00 | 0.00 | 3.43 | 7.27 | 7.33 | 7.25 | 5.25 | 3.17 | 7.38 |
|  | Ta$_2$O$_5$ | 3.98 | 7.86 | 7.60 | 8.06 | 8.12 | 8.03 | 8.15 | 8.22 | 8.18 |
|  | WO$_3$ | 16.72 | 16.50 | 15.97 | 16.92 | 17.04 | 16.85 | 17.11 | 17.26 | 17.17 |
|  | Bi$_2$O$_3$ | 0.00 | 0.00 | 0.00 | 0.00 | 0.00 | 0.00 | 0.00 | 0.00 | 0.00 |
|  | Li$_2$O | 0.00 | 0.00 | 0.00 | 0.00 | 0.00 | 0.00 | 0.00 | 0.00 | 0.00 |
|  | Na$_2$O | 0.00 | 0.00 | 0.00 | 0.00 | 0.00 | 0.00 | 0.00 | 0.00 | 0.00 |
|  | K$_2$O | 0.00 | 0.00 | 0.00 | 0.00 | 0.00 | 0.00 | 0.00 | 0.00 | 0.00 |
|  | MgO | 0.00 | 0.00 | 0.00 | 0.00 | 0.00 | 0.00 | 0.00 | 0.00 | 0.00 |
|  | CaO | 0.00 | 0.00 | 0.00 | 0.00 | 0.00 | 0.00 | 0.00 | 0.00 | 0.00 |
|  | SrO | 0.00 | 0.00 | 0.00 | 0.00 | 0.00 | 0.00 | 0.00 | 0.00 | 0.00 |
|  | BaO | 0.00 | 0.00 | 0.00 | 0.00 | 0.00 | 0.00 | 0.00 | 0.00 | 0.00 |
|  | GeO$_2$ | 0.00 | 0.00 | 0.00 | 0.00 | 0.00 | 0.00 | 0.00 | 0.00 | 0.00 |
|  | Total | 100.00 | 100.00 | 100.00 | 100.00 | 100.00 | 100.00 | 100.00 | 100.00 | 100.00 |

|  | No. | 10 Mass % | 11 Mass % | 12 Mass % | 13 Mass % | 14 Mass % | 15 Mass % | 16 Mass % | 17 Mass % | 18 Mass % |
|---|---|---|---|---|---|---|---|---|---|---|
| Mass % | SiO$_2$ | 1.06 | 1.15 | 1.04 | 1.14 | 1.01 | 1.13 | 1.13 | 1.05 | 0.51 |
|  | B$_2$O$_3$ | 8.58 | 9.30 | 8.44 | 9.22 | 8.19 | 9.15 | 9.20 | 8.53 | 9.53 |
|  | ZnO | 12.18 | 13.21 | 11.99 | 13.09 | 11.65 | 10.36 | 13.06 | 12.11 | 11.78 |
|  | La$_2$O$_3$ | 22.96 | 24.89 | 22.60 | 24.66 | 21.95 | 24.48 | 24.61 | 22.82 | 24.54 |
|  | Gd$_2$O$_3$ | 17.10 | 17.11 | 16.83 | 17.31 | 16.35 | 16.83 | 17.28 | 16.67 | 16.97 |
|  | Y$_2$O$_3$ | 1.00 | 1.08 | 0.98 | 1.07 | 0.95 | 1.06 | 1.07 | 0.99 | 0.00 |
|  | Yb$_2$O$_3$ | 0.00 | 0.00 | 0.00 | 0.00 | 0.00 | 0.00 | 0.00 | 0.00 | 0.00 |
|  | ZrO$_2$ | 2.17 | 2.35 | 2.14 | 2.33 | 2.08 | 2.31 | 2.32 | 2.16 | 2.24 |
|  | TiO$_2$ | 3.82 | 1.52 | 1.39 | 1.51 | 1.35 | 1.50 | 1.51 | 1.40 | 1.45 |
|  | Nb$_2$O$_5$ | 7.02 | 3.25 | 10.86 | 7.54 | 6.71 | 7.49 | 7.53 | 6.98 | 7.25 |
|  | Ta$_2$O$_5$ | 7.78 | 8.43 | 7.66 | 8.37 | 7.43 | 8.29 | 4.76 | 11.06 | 8.89 |
|  | WO$_3$ | 16.33 | 17.71 | 16.07 | 13.78 | 22.33 | 17.42 | 17.52 | 16.24 | 16.85 |
|  | Bi$_2$O$_3$ | 0.00 | 0.00 | 0.00 | 0.00 | 0.00 | 0.00 | 0.00 | 0.00 | 0.00 |
|  | Li$_2$O | 0.00 | 0.00 | 0.00 | 0.00 | 0.00 | 0.00 | 0.00 | 0.00 | 0.00 |
|  | Na$_2$O | 0.00 | 0.00 | 0.00 | 0.00 | 0.00 | 0.00 | 0.00 | 0.00 | 0.00 |
|  | K$_2$O | 0.00 | 0.00 | 0.00 | 0.00 | 0.00 | 0.00 | 0.00 | 0.00 | 0.00 |
|  | MgO | 0.00 | 0.00 | 0.00 | 0.00 | 0.00 | 0.00 | 0.00 | 0.00 | 0.00 |
|  | CaO | 0.00 | 0.00 | 0.00 | 0.00 | 0.00 | 0.00 | 0.00 | 0.00 | 0.00 |
|  | SrO | 0.00 | 0.00 | 0.00 | 0.00 | 0.00 | 0.00 | 0.00 | 0.00 | 0.00 |
|  | BaO | 0.00 | 0.00 | 0.00 | 0.00 | 0.00 | 0.00 | 0.00 | 0.00 | 0.00 |
|  | GeO$_2$ | 0.00 | 0.00 | 0.00 | 0.00 | 0.00 | 0.00 | 0.00 | 0.00 | 0.00 |
|  | Total | 100.00 | 100.00 | 100.00 | 100.00 | 100.00 | 100.00 | 100.00 | 100.00 | 100.00 |

|  | No | 19 Mass % | 20 Mass % | 21 Mass % | 22 Mass % | 23 Mass % | 24 Mass % | 25 Mass % | 26 Mass % | 27 Mass % |
|---|---|---|---|---|---|---|---|---|---|---|
| Mass % | SiO$_2$ | 1.09 | 1.16 | 2.17 | 2.12 | 0.50 | 0.51 | 0.50 | 0.53 | 0.51 |
|  | B$_2$O$_3$ | 8.80 | 9.40 | 9.75 | 9.55 | 9.45 | 9.60 | 8.85 | 9.90 | 9.61 |
|  | ZnO | 12.51 | 13.34 | 14.98 | 14.68 | 11.68 | 11.78 | 11.60 | 12.24 | 11.87 |
|  | La$_2$O$_3$ | 25.05 | 19.73 | 27.14 | 26.59 | 24.32 | 24.54 | 24.17 | 21.54 | 24.09 |
|  | Gd$_2$O$_3$ | 16.89 | 17.29 | 19.67 | 19.28 | 16.83 | 16.97 | 16.71 | 17.64 | 17.06 |
|  | Y$_2$O$_3$ | 0.00 | 1.09 | 0.22 | 0.22 | 0.00 | 0.00 | 0.00 | 0.00 | 0.00 |
|  | Yb$_2$O$_3$ | 0.00 | 0.00 | 0.00 | 0.00 | 0.00 | 0.00 | 0.00 | 0.00 | 0.00 |

-continued

| No | | | | | | | | | |
|---|---|---|---|---|---|---|---|---|---|
| ZrO$_2$ | 2.23 | 2.37 | 3.75 | 3.67 | 2.22 | 2.24 | 2.21 | 2.33 | 2.25 |
| TiO$_2$ | 1.45 | 1.54 | 3.68 | 2.77 | 0.20 | 0.00 | 1.43 | 1.51 | 0.00 |
| Nb$_2$O$_5$ | 7.21 | 7.69 | 2.21 | 1.66 | 9.25 | 10.43 | 9.18 | 7.53 | 10.47 |
| Ta$_2$O$_5$ | 7.99 | 8.51 | 3.34 | 2.51 | 8.82 | 8.89 | 8.76 | 9.24 | 8.97 |
| WO$_3$ | 16.77 | 17.89 | 13.09 | 16.95 | 16.72 | 15.04 | 16.60 | 17.52 | 15.17 |
| Bi$_2$O$_3$ | 0.00 | 0.00 | 0.00 | 0.00 | 0.00 | 0.00 | 0.00 | 0.00 | 0.00 |
| Li$_2$O | 0.00 | 0.00 | 0.00 | 0.00 | 0.00 | 0.00 | 0.00 | 0.00 | 0.00 |
| Na$_2$O | 0.00 | 0.00 | 0.00 | 0.00 | 0.00 | 0.00 | 0.00 | 0.00 | 0.00 |
| K$_2$O | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 | 0.00 |
| GeO$_2$ | 0.00 | 0.00 | 0.00 | 0.00 | 0.00 | 0.00 | 0.00 | 0.00 | 0.00 |
| Total | 100.00 | 100.00 | 100.00 | 100.00 | 100.00 | 100.00 | 100.00 | 100.00 | 100.00 |

| | No | 28 Mass % | 29 Mass % | 30 Mass % | 31 Mass % | 32 Mass % | 33 Mass % | 34 Mass % | 35 Mass % | 36 Mass % |
|---|---|---|---|---|---|---|---|---|---|---|
| Mass % | SiO$_2$ | 0.99 | 1.00 | 1.01 | 1.00 | 0.99 | 1.00 | 1.00 | 1.01 | 0.98 |
| | B$_2$O$_3$ | 9.23 | 9.33 | 9.43 | 9.30 | 9.28 | 9.35 | 9.33 | 9.47 | 9.20 |
| | ZnO | 11.96 | 10.79 | 9.60 | 10.76 | 10.73 | 9.52 | 9.50 | 7.02 | 10.64 |
| | La$_2$O$_3$ | 24.26 | 24.52 | 24.78 | 24.46 | 24.39 | 24.58 | 24.53 | 24.91 | 24.18 |
| | Gd$_2$O$_3$ | 17.07 | 17.25 | 17.43 | 17.21 | 17.16 | 17.29 | 17.26 | 17.52 | 17.01 |
| | Y$_2$O$_3$ | 0.00 | 0.00 | 0.00 | 0.00 | 0.00 | 0.00 | 0.00 | 0.00 | 0.00 |
| | Yb$_2$O$_3$ | 0.00 | 0.00 | 0.00 | 0.00 | 0.00 | 0.00 | 0.00 | 0.00 | 0.00 |
| | ZrO$_2$ | 2.28 | 2.30 | 2.32 | 2.29 | 2.29 | 2.31 | 2.30 | 2.34 | 2.27 |
| | TiO$_2$ | 1.26 | 1.27 | 1.28 | 1.27 | 1.26 | 1.27 | 1.27 | 1.29 | 1.25 |
| | Nb$_2$O$_5$ | 8.20 | 8.29 | 8.37 | 8.26 | 8.24 | 8.31 | 8.29 | 8.42 | 8.17 |
| | Ta$_2$O$_5$ | 9.03 | 9.13 | 9.22 | 9.10 | 9.08 | 9.15 | 9.13 | 9.27 | 9.00 |
| | WO$_3$ | 15.73 | 15.90 | 16.07 | 15.86 | 15.82 | 15.94 | 15.91 | 16.15 | 15.68 |
| | Bi$_2$O$_3$ | 0.00 | 0.00 | 0.00 | 0.00 | 0.00 | 0.00 | 0.00 | 0.00 | 0.00 |
| | Li$_2$O | 0.00 | 0.24 | 0.48 | 0.00 | 0.00 | 0.00 | 0.00 | 0.00 | 0.00 |
| | Na$_2$O | 0.00 | 0.00 | 0.00 | 0.49 | 0.00 | 0.00 | 0.00 | 0.00 | 0.00 |
| | K$_2$O | 0.00 | 0.00 | 0.00 | 0.00 | 0.74 | 0.00 | 1.50 | 0.00 | 0.00 |
| | MgO | 0.00 | 0.00 | 0.00 | 0.00 | 0.00 | 1.28 | 0.00 | 2.60 | 0.00 |
| | CaO | 0.00 | 0.00 | 0.00 | 0.00 | 0.00 | 0.00 | 0.00 | 0.00 | 0.00 |
| | SrO | 0.00 | 0.00 | 0.00 | 0.00 | 0.00 | 0.00 | 0.00 | 0.00 | 1.62 |
| | BaO | 0.00 | 0.00 | 0.00 | 0.00 | 0.00 | 0.00 | 0.00 | 0.00 | 0.00 |
| | GeO$_2$ | 0.00 | 0.00 | 0.00 | 0.00 | 0.00 | 0.00 | 0.00 | 0.00 | 0.00 |
| | Total | 100.00 | 100.00 | 100.00 | 100.00 | 100.00 | 100.00 | 100.00 | 100.00 | 100.00 |

| | No. | 37 Mass % | 38 Mass % | 39 Mass % | 40 Mass % | 41 Mass % | 42 Mass % | 43 Mass % |
|---|---|---|---|---|---|---|---|---|
| Mass % | SiO$_2$ | 0.98 | 0.00 | 0.98 | 0.98 | 1.03 | 1.05 | 0.97 |
| | B$_2$O$_3$ | 9.13 | 9.16 | 8.59 | 9.21 | 9.60 | 9.82 | 9.02 |
| | ZnO | 10.56 | 11.87 | 11.83 | 11.92 | 4.45 | 0.00 | 11.69 |
| | La$_2$O$_3$ | 23.99 | 24.09 | 24.00 | 22.92 | 25.24 | 25.82 | 23.72 |
| | Gd$_2$O$_3$ | 16.88 | 16.95 | 16.88 | 17.02 | 17.76 | 18.17 | 17.02 |
| | Y$_2$O$_3$ | 0.00 | 0.00 | 0.00 | 0.00 | 0.00 | 0.00 | 0.00 |
| | Yb$_2$O$_3$ | 0.00 | 0.00 | 0.00 | 1.54 | 0.00 | 0.00 | 0.00 |
| | ZrO$_2$ | 2.25 | 2.26 | 2.25 | 2.27 | 2.37 | 2.42 | 4.11 |
| | TiO$_2$ | 1.24 | 1.25 | 1.24 | 1.25 | 1.31 | 1.34 | 1.23 |
| | Nb$_2$O$_5$ | 8.11 | 8.14 | 8.11 | 8.18 | 8.53 | 8.73 | 8.01 |
| | Ta$_2$O$_5$ | 8.93 | 8.97 | 8.93 | 9.01 | 9.40 | 9.61 | 8.83 |
| | WO$_3$ | 15.56 | 15.62 | 15.56 | 15.69 | 16.37 | 16.75 | 15.40 |
| | Bi$_2$O$_3$ | 0.00 | 0.00 | 0.00 | 0.00 | 0.00 | 0.00 | 0.00 |
| | Li$_2$O | 0.00 | 0.00 | 0.00 | 0.00 | 0.00 | 0.00 | 0.00 |
| | Na$_2$O | 0.00 | 0.00 | 0.00 | 0.00 | 0.00 | 0.00 | 0.00 |
| | K$_2$O | 0.00 | 0.00 | 0.00 | 0.00 | 0.00 | 0.00 | 0.00 |
| | MgO | 0.00 | 0.00 | 0.00 | 0.00 | 3.95 | 6.30 | 0.00 |
| | CaO | 0.00 | 0.00 | 0.00 | 0.00 | 0.00 | 0.00 | 0.00 |
| | SrO | 0.00 | 0.00 | 0.00 | 0.00 | 0.00 | 0.00 | 0.00 |
| | BaO | 2.38 | 0.00 | 0.00 | 0.00 | 0.00 | 0.00 | 0.00 |
| | GeO$_2$ | 0.00 | 1.71 | 1.63 | 0.00 | 0.00 | 0.00 | 0.00 |
| | Total | 100.00 | 100.00 | 100.00 | 100.00 | 100.00 | 100.00 | 100.00 |

Example 2

In the same manner as in Example 1, each of the glass indicated in Table 1 was manufactured with a platinum vessel. In the present Example, an outflow pipe made of platinum was mounted on the bottom of the platinum vessel. The glass was melted, clarified, and homogenized by known methods. Subsequently, the homogeneous glass melt was caused to continuously flow out of the outflow pipe and be cast into a casting mold. It was molded into a glass block, annealed, and cut to obtain multiple glass pieces. The glass pieces were ground and polished to manufacture preforms comprised of each of the optical glass indicated in Table 1. The preforms obtained were optically homogeneous, high-quality preforms.

A batch starting material obtained by blending multiple types of compounds can also be employed as the glass starting material. The batch starting material can be rough melted and vitrified to obtain a cullet starting material for use.

Example 3

Next, a small-diameter nozzle was mounted on the front end of the outflow pipe and the glass starting material was melted, clarified, and homogenized in the same manner as in Example 2. Drops of glass melt were successively separated from the front end of the nozzle. Multiple pressing molds were used to receive the glass melt drops one after another and mold them into preforms. In the process of molding preforms from the glass melt drops, gas was blown from the pressing mold to apply upward air pressure on the glass gobs and maintain them in a floating state. The preforms were then cooled to within a temperature range at which they would not deform and removed from the pressing molds to continuously obtain multiple preforms. Known pressing devices can be employed to mold the preforms. Preforms comprised of each of the optical glass indicated in Table 1 were manufactured in this manner. The preforms obtained were optically homogeneous, high-quality preforms. No precipitation of crystals was observed, either on the surface or in the interior. It is also possible to employ a batch starting material obtained by blending multiple types of compounds as the glass starting material. The batch starting material can be rough melted and vitrified to obtain a cullet starting material for use.

Example 4

The surfaces of the preforms manufactured in Examples 2 and 3 were coated as needed. The preforms were introduced into pressing molds comprising upper, lower, and sleeve molds made of SiC provided with a carbon mold release film on the molding surfaces thereof. In a nitrogen atmosphere, the pressing molds and the preforms were heated together to soften the preform. Precision press molding was conducted to manufacture various lenses comprised of each of the glass set forth above in the form of aspherical convex meniscus lenses, aspherical concave meniscus lenses, aspherical biconvex lenses, and aspherical biconcave lenses. The precision press molding conditions were adjusted within the ranges set forth above.

When the lens surfaces of the various lenses thus manufactured were observed, they exhibited absolutely no scratching, clouding, or damage.

This process was repeatedly conducted to test large volume production of the various lenses. Four hundred or more cycles of precision press molding were conducted with the same pressing mold. However, no problems such as fusion of the glass to the pressing mold occurred. It was possible to produce with high precision lenses with both high-quality surfaces and interiors.

Antireflective films could also be coated on the surface of lenses obtained in this manner.

Next, preforms identical to the above were heated and softened. They were then introduced into a separately preheated pressing mold and precision press molded to manufacture various lenses comprised of each of the glass set forth above in the form of aspherical convex meniscus lenses, aspherical concave meniscus lenses, aspherical biconvex lenses, and aspherical biconcave lenses. The precision press molding conditions were adjusted within the ranges set forth above.

Observation of the various lenses thus manufactured revealed no clouding or the like due to phase separation, and absolutely no scratching, clouding, or damage to the lens surfaces.

This process was repeatedly conducted to test large volume production of the various lenses. Four hundred or more cycles of precision press molding were conducted with the same pressing mold. However, no problems such as fusion of the glass to the pressing mold occurred. It was possible to produce with high precision lenses with both high-quality surfaces and interiors.

Antireflective films could also be coated on the surface of lenses obtained in this manner.

The shape of the molding surfaces of the pressing mold could also be suitably changed to manufacture various optical elements such as prisms, microlenses, and lens arrays.

Comparative Example 1

Next, each of the glass was manufactured in the form of Optical Glass No. 7 described in Table 2 of above Document 2 (referred to as Glass A, hereinafter), Optical Glass No. 24 (referred to as Glass B, hereinafter) and No. 25 (referred to as Glass C, hereinafter) described in Table 1 of Document 4, Optical Glass No. 5 described in Table 1 of Document 5 (referred to as Glass D, hereinafter), and Oxide Glass No. 2 described in Tables 1-1 to 1-5 of Document 6 (referred to as Glass E, hereinafter) by the methods described in each document.

Fusion tests were conducted using test panels by the method set forth above on Glasses A to E. As a result, each of Glasses A to E exhibited fusion to the test panel.

Next, multiple preforms for precision press molding variously comprised of Glasses A to E were manufactured. Repeated precision press molding was conducted by the same method as in Example 4 using these preforms and the number of pressing cycles required for fusing of the glass to the pressing mold to occur was checked. For Glasses A to C, it was possible to conduct 50 to 90 cycles of precision press molding. For Glasses D and E, it was possible to conduct 30 to 80 cycles of precision press molding. Table 4 gives the compositions, characteristics, fusion test results, and number of cycles of precision press molding possible with Glasses A to C.

Among Glasses A to E, Glass A had the highest cation ratio $(Ta^{5+}/(Ti^{4+}+Ta^{5+}))$, with a value of 0.20. Among the glasses indicated in Table 1, Glass Nos. 1, 21, and 22 had the lowest cation ratio for $(Ta^{5+}/(Ti^{4+}+Ta^{5+}))$, with a value of 0.25.

Glasses A to E exhibited fusion with the test panel in the fusion test and were capable of less than 100 cycles of precision press molding. By contrast, the various glasses set forth above with a cation ratio $(Ta^{5+}/(Ti^{4+}+Ta^{5+}))$ of 0.25 did not exhibit fusion to the test panel in the fusion test and were capable of 400 or more cycles of precision press molding. Based on these results, keeping the cation ratio $(Ta^{5+}/(Ti^{4+}+Ta^{5+}))$ to equal to or higher than 0.23 greatly increased the number of cycles of precision press molding that was possible.

Glasses A to E were high refractive index glasses that were difficult to mold by precision press molding, being capable of only 30 to 90 cycles of continuous precision press molding. Compared to the test results in Example 4, they were capable of far fewer cycles of continuous precision press molding.

TABLE 4

| Cation % | Document 2 Optical glass No. 7 (Glass A) | Document 4 Optical glass No. 24 (Glass B) | Document 4 Optical glass No. 25 (Glass C) | Document 5 Optical glass No. 5 (Glass D) | Document 6 Oxide glass No. 2 (Glass E) |
|---|---|---|---|---|---|
| $Si^{4+}$ | 2 | 0.88 | 0.85 | 3 | 10.48 |
| $B^{3+}$ | 45 | 33.03 | 32.07 | 35.5 | 27.8 |
| $Li^+$ | 0 | 11.94 | 14.5 | 0 | 0 |
| $Na^+$ | 0 | 0 | 0 | 0 | 0 |
| $K^+$ | 0 | 0 | 0 | 0 | 0 |
| $Mg^{2+}$ | 0 | 0 | 0 | 0 | 0 |
| $Ca^{2+}$ | 0 | 0 | 0 | 0 | 0 |
| $Sr^{2+}$ | 0 | 0 | 0 | 0 | 0 |
| $Ba^{2+}$ | 0 | 0 | 0 | 0 | 4.96 |
| $Zn^{2+}$ | 15 | 17.5 | 12.14 | 22 | 3.44 |
| $La^{3+}$ | 14 | 13.21 | 12.83 | 17 | 24.26 |
| $Gd^{3+}$ | 6 | 5.28 | 5.13 | 7 | 3 |
| $Y^{3+}$ | 0 | 0 | 0 | 0 | 1.1 |
| $Yb^{3+}$ | 0 | 0 | 0 | 0 | 0 |
| $Zr^{4+}$ | 0 | 0.23 | 0.22 | 0.5 | 4.81 |
| $Ti^{4+}$ | 8 | 6.15 | 5.97 | 6 | 15.08 |
| $Nb^{5+}$ | 2 | 0 | 0 | 0 | 5.07 |
| $Ta^{5+}$ | 2 | 0 | 0 | 0 | 0 |
| $W^{6+}$ | 6 | 11.78 | 16.29 | 9 | 0 |
| $Ge^{4+}$ | 0 | 0 | 0 | 0 | 0 |
| $Bi^{3+}$ | 0 | 0 | 0 | 0 | 0 |
| $Al^{3+}$ | 0 | 0 | 0 | 0 | 0 |
| 합계 | 100 | 100 | 100 | 100 | 100 |
| $B^{3+} + Si^{4+}$ | 47 | 33.91 | 32.92 | 38.5 | 38.28 |
| $Si^{4+}/B^{3+}$ | 0.044 | 0.027 | 0.027 | 0.085 | 0.377 |
| $La^{3+} + Gd^{3+} + Y^{3+} + Yb^{3+}$ | 20 | 18.49 | 17.96 | 24 | 28.36 |
| $Ti^{4+} + Nb^{5+} + Ta^{5+} + W^{6+} + Bi^{4+}$ | 18 | 17.93 | 22.26 | 15 | 20.15 |
| $Ti^{4+} + Ta^{5+}$ | 10 | 6.15 | 5.97 | 6 | 15.08 |
| $Nb^{5+} + W^{6+}$ | 8 | 11.78 | 16.29 | 9 | 5.07 |
| $Ta^{5+}/(Ti^{4+} + Ta^{5+})$ | 0.20 | 0 | 0 | 0 | 0 |
| $W^{6+}/(Nb^{5+} + W^{6+})$ | 0.75 | 1 | 1 | 1 | 0 |
| $(Ti^{4+} + Nb^{5+} + Ta^{5+} + W^{6+} + Bi^{4+})/(B^{3+} + Si^{4+})$ | 0.383 | 0.529 | 0.676 | 0.390 | 0.526 |
| $Zn^{2+} + Mg^{2+}$ | 15 | 17.5 | 12.14 | 22 | 3.44 |
| $(Zn^{2+} + Lr^+ + Mg^{2+})/(La^{3+} + Gd^{3+} + Y^{3+} + Yb^{3+})$ | 0.75 | 1.592 | 1.483 | 0.917 | 0.121 |
| Refractive index nd | 1.9022 | 1.90129 | 1.90405 | 1.90824 | 1.94938 |
| Abbé number vd | 31.1 | 30.88 | 30.08 | 32.14 | 30.32 |
| Glass transition temperature Tg[° C.] | 590 | 508 | 503 | 593 | 686 |
| Fusion test | Fused | Fused | Fused | Fused | Fused |
| Number of cycles capable of precision press molding | 50 to 90 cycles | 50 to 90 cycles | 50 to 90 cycles | 30 to 80 cycles | 30 to 80 cycles |

Comparative Example 2

When Optical Glass Nos. 1 to 51 described in the Examples of above Document 3 were subjected to a surface devitrification test by the method set forth above, all of the glasses exhibited crystal number surface densities in excess of $10^4$ crystals/cm$^2$.

Multiple preforms for precision press molding comprised of Optical Glass No. 26 described in Document 3 were manufactured by molding while floating the glass melt gob. The volume of the preform was 800 mm$^3$. As a result, crystal precipitation was observed on the surfaces of equal to or more than half of the preforms, amounting to a production yield of less than 50%. When the same test was conducted on glasses other than Optical Glass No. 26, the same results were obtained.

Example 5

Various interchangeable lenses for a single-lens reflex camera were manufactured with the various lenses manufactured in Example 4 built in. Various optical systems for compact digital cameras were manufactured and modularized with the various lenses manufactured in Example 4. These optical systems were also equipped with CCD, CMOS, or similar image sensors and modularized.

Using the various lenses manufactured in Example 4, it was possible to obtain highly functional, compact optical systems, interchangeable lenses, lens modules, and image pickup devices. By combining the lenses manufactured in Example 4 with lenses made of low dispersion optical glasses, it was possible to obtain various optical systems performing high-order chromatic aberration correction and image pickup devices equipped with these optical systems.

Finally, preferred embodiments of the present aspect of carrying out the invention will be summarized.

A preferred embodiment of the present aspect carrying out the invention is optical glass in which the $O^{2-}$ content is equal to or higher than 98 anion %.

Another preferred embodiment is optical glass in which the $Zn^{2+}$ content is equal to or higher than 5%, preferably optical glass in which the $Zn^{2+}$ content is equal to or higher than 8%.

Still another preferred embodiment is optical glass in which the cation ratio $(Zn^{2+}/(Zn^{2+}+Mg^{2+}))$ is equal to or higher than 0.6.

Still another preferred embodiment is optical glass in which the Yb content, as the content of $Yb_2O_3$ in the glass composition based on oxides, is less than 2.0 mass %.

Still another preferred embodiment is optical glass in which the cation ratio $((Nb^{5+}+Ta^{5+})/(Ti^{4+}+Nb^{5+}+Ta^{5+}+W^{6+}+Bi^{3+}))$ is equal to or higher than 0.01.

Still another preferred embodiment is optical glass in which the cation ratio $((Nb^{5+}+Ta^{5+})/(Ti^{4+}+Nb^{5+}+Ta^{5+}+W^{6+}+Bi^{n}))$ is lower than 0.7.

Still another preferred embodiment is optical glass in which the cation ratio $(Ti^{4+}/(Ti^{4+}+Nb^{5+}+Ta^{5+}+W^{6+}+Bi^{3+}))$ is equal to or lower than 0.43.

Still another preferred embodiment is optical glass in which the cation ratio $((Ti^{4+}+Nb^{5+}+Ta^{5+}+W^{6+}+Bi^{3+})/(La^{3+}+Gd^{3+}+Y^{3+}+Yb^{3+}))$ ranges from 0.40 to 4.00.

Still another preferred embodiment is optical glass in which the cation ratio $(Te^{4+}/(Zn^{2+}+Mg^{2+}))$ is lower than 1.0.

Still another preferred embodiment is optical glass in which the Ge content, as the content of $GeO_2$ in the glass composition based on oxides, is lower than 5.0 mass %.

Still another preferred embodiment is optical glass in which the liquidus temperature is equal to or lower than 1,250° C.

Still another preferred embodiment is optical glass having the precision press molding property such that there is no fusion to the test panel in the fusion test with a test panel by the method set forth above, Still another preferred embodiment is optical glass wherein the cation ratio $(Ta^{5+}/(Ti^{4+}+Ta^{5+}))$ is set so as to impart a precision press molding property such that there is no fusion to the test panel in the fusion test with a test panel by the method set forth above.

The optical glass according to an aspect of the present invention is suited to the high-order correction of chromatic aberration and can be suitably employed to manufacture preforms for precision press molding and optical elements.

The implementation modes that have been disclosed herein are but examples in all regards and are not to be considered as limitations. The scope of the present invention is disclosed by the scope of the claims and not by the description given above. All modifications falling within the meaning and scope that are equivalent to the scope of the claims are intended to be covered.

The invention claimed is:

1. Optical glass, which is oxide glass comprising, denoted as cation %,
    a total of 5 to 60% of $B^{3+}$ and with 5 to 50% of $B^{3+}$,
    a total of equal to or higher than 5% of $Zn^{2+}$ and $Mg^{2+}$,
    a total of 10 to 50% of $La^{3+}$, $Gd^{3+}$, $Y^{3+}$, and $Yb^{3+}$, and
    a total of 6 to 45% of $Ti^{4+}$, $Nb^{5+}$, $Ta^{5+}$, $W^{6+}$, and $Bi^{3+}$, with a total content of $Ti^{4+}$ and $Ta^{5+}$ being higher than 0% and a content of $W^{6+}$ being higher than 5%;
    wherein a cation ratio of a content of $Si^{4+}$ to a content of $B^{3+}$, $Si^{4+}/B^{3+}$, is equal to or lower than 0.70;
    a cation ratio of a content of $Ta^{5+}$ to a total content of $Ti^{4+}$ and $Ta^{5+}$, $Ta^{5+}/(Ti^{4+}+Ta^{5+})$, is equal to or higher than 0.23;
    a cation ratio of a content of $W^{6+}$ to a total content of $Nb^{5+}$ and $W^{6+}$, $W^{6+}/(Nb^{5+}+W^{6+})$, is equal to or higher than 0.30;
    a cation ratio of a total content of $Ti^{4+}$, $Nb^{5+}$, $Ta^{5+}$, $W^{6+}$, and $B^{3+}$ to a total content of $B^{3+}$ and $Si^{4+}$, $(Ti^{4+}+Nb^{5+}+Ta^{5+}+W^{6+}+B^{3+})/(B^{3+}+Si^{4+})$, is higher than 0.37 but equal to or lower than 3.00;
    a cation ratio of a total content of $Zn^{2+}$, $Mg^{2+}$, and $Li^+$ to a total content of $La^{3+}$, $Gd^{3+}$, $Y^{3+}$, and $Yb^{3+}$, $(Zn^{2+}+Mg^{2+}+Li^+)/(La^{3+}+Gd^{3+}+Y^{3+}+Yb^{3+})$, is equal to or higher than 0.40; and
    which has a refractive index nd ranging from 1.90 to 2.00 and an Abbé number νd satisfying the following equation (1):

$$25 \leq \nu d < (3.91-nd)/0.06 \qquad (1).$$

2. The optical glass according to claim 1, which has a glass transition temperature of equal to or lower than 650° C.

3. The optical glass according to claim 1, wherein a content of Ge is less than 5.0 mass % as a content of $GeO_2$ in a glass composition based on oxides, and a cation ratio of a content of $Te^{4+}$ to a total content of $Zn^{2+}$ and $Mg^{2+}$, $Te^{4+}/(Zn^{2+}+Mg^{2+})$, is lower than 1.

4. The optical glass according to claim 1, which comprises equal to or higher than 8 cation % of $Zn^{2+}$ and $Mg^{2+}$ combined.

5. The optical glass according to claim 1, wherein a content of Yb is lower than 2.0 mass % as a content of $Yb_2O_3$ in a glass composition based on oxides.

6. A precision press molding preform, which is comprised of the optical glass according to claim 1.

7. An optical element, which is comprised of the optical glass according to claim 1.

8. A method of manufacturing an optical element, which comprises heating and precision press molding with a pressing mold the precision press molding preform according to claim 6 to obtain an optical element.

9. The method of manufacturing an optical element according to claim 8, which comprises heating the precision press molding preform together with a pressing mold after introducing the precision press molding preform into the pressing mold.

10. The method of manufacturing an optical element according to claim 8, which comprises heating the precision press molding preform and then introducing into a pressing mold to conducting the precision press molding.

* * * * *